US012098062B2

(12) United States Patent
Henderson

(10) Patent No.: US 12,098,062 B2
(45) Date of Patent: Sep. 24, 2024

(54) AUTONOMOUS ROBOTIC CARGO SYSTEM

(71) Applicant: Integrated Solutions for Systems, Inc., Huntsville, AL (US)

(72) Inventor: Robert D. Henderson, Huntsville, AL (US)

(73) Assignee: Integrated Solutions for Systems, Inc., Huntsville, AL (US)

( * ) Notice: Subject to any disclaimer, the term of this patent is extended or adjusted under 35 U.S.C. 154(b) by 253 days.

(21) Appl. No.: 16/930,073

(22) Filed: Jul. 15, 2020

(65) Prior Publication Data

US 2022/0017341 A1    Jan. 20, 2022

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *G05D 1/0236* (2013.01); *G05D 1/024* (2013.01);
(Continued)

(58) Field of Classification Search
CPC ..... B66F 9/063; B66F 9/0755; G05D 1/0236; G05D 1/024; G05D 1/0242; G05D 1/027;
(Continued)

(56) References Cited

U.S. PATENT DOCUMENTS

| 4,858,855 A | 8/1989 | Dalbera |
| 5,280,431 A | 1/1994 | Summerville et al. |

(Continued)

FOREIGN PATENT DOCUMENTS

| CN | 111664843 A | * | 9/2020 | |
| CN | 111918791 A | * | 11/2020 | .............. B25J 19/02 |

(Continued)

OTHER PUBLICATIONS

Machine Translation: CN-111918791-A (year:2020).*

(Continued)

*Primary Examiner* — Anne Marie Antonucci
*Assistant Examiner* — Connor L Knight
(74) *Attorney, Agent, or Firm* — Bradley Arant Boult Cummings

(57) ABSTRACT

The present disclosure is an autonomous robotic cargo system for moving and accurately positioning cargo inside an aircraft or at any other designated location in an austere environment. The system has a chassis coupled to one or more tracks for moving the chassis from a first location to a second location. The chassis is also coupled to one or more forks for loading cargo and unloading the cargo. In addition, the chassis has a laser scanner positioned on the chassis to capture data indicative of the chassis' environment. The system further has a control processor that pre-generates a preliminary pathway for the chassis to travel from the first location to the second location based upon laser scanner data received from the laser scanner. The control processor also controls the one or more forks to pick up cargo and controls the one or more tracks to move the cargo from the first location to the second location.

31 Claims, 13 Drawing Sheets

(51) Int. Cl.
  *G05D 1/00*   (2006.01)
  *G05D 1/02*   (2020.01)
  *G06T 7/579*  (2017.01)

(52) U.S. Cl.
  CPC .......... *G05D 1/0242* (2013.01); *G05D 1/027* (2013.01); *G06T 7/579* (2017.01)

(58) Field of Classification Search
  CPC ......... G05D 2201/0216; G05D 1/0248; G05D 1/0278; G05D 1/0274; G06T 7/579
  See application file for complete search history.

(56) References Cited

U.S. PATENT DOCUMENTS

| | | | |
|---|---|---|---|
| 6,129,026 | A * | 10/2000 | LeCroy .................. B64F 1/324 104/88.01 |
| 7,261,511 | B2 | 8/2007 | Felder et al. |
| 7,343,995 | B2 | 3/2008 | Fukuhara et al. |
| 8,210,791 | B2 | 7/2012 | Chilson et al. |
| 9,075,412 | B2 | 7/2015 | Dixon et al. |
| 9,096,317 | B2 | 8/2015 | Huber |
| 9,535,421 | B1 | 1/2017 | Canoso et al. |
| 9,844,877 | B1 * | 12/2017 | Jules ..................... B25J 9/1664 |
| 9,944,213 | B2 | 4/2018 | Ambrosio et al. |
| 9,971,351 | B2 | 5/2018 | Deutscher et al. |
| 10,059,450 | B2 | 8/2018 | Levron |
| 2005/0198750 | A1 * | 9/2005 | Spencer .................. B64F 1/002 14/71.5 |
| 2010/0023185 | A1 * | 1/2010 | Terwelp .................. G01S 17/86 356/3 |
| 2012/0185115 | A1 * | 7/2012 | Dean ....................... F41H 7/005 701/2 |
| 2013/0240673 | A1 | 9/2013 | Schlosser et al. |
| 2016/0332554 | A1 * | 11/2016 | Ambrosio ............... G05D 1/024 |
| 2018/0072517 | A1 | 3/2018 | Girtman et al. |
| 2019/0235083 | A1 * | 8/2019 | Zhang ...................... G01S 7/51 |
| 2021/0056499 | A1 * | 2/2021 | Jacobus .................. B66F 9/0755 |
| 2021/0276800 | A1 * | 9/2021 | Luckay ................. B65G 1/1373 |

FOREIGN PATENT DOCUMENTS

| | | |
|---|---|---|
| DE | 202013008718 U1 | 12/2013 |
| WO | 2018211481 A1 | 11/2018 |

OTHER PUBLICATIONS

Machine Translation: CN-111664843-A (year:2020).*
Vasiljević, Goran et al., "High-accuracy vehicle localization for autonomous warehousing," Robotics and Computer-Integrated Manufacturing, vol. 42, Dec. 2016, 43 pages.

* cited by examiner

AUTONOMOUS ROBOTIC CARGO SYSTEM

GOVERNMENT LICENSE RIGHTS

This invention was made with government support under contract number M67854-19-P-6620 awarded by the Marine Corps System Command. The government has certain rights in the invention.

BACKGROUND

In warfare, a theater is an area in which military events occur or are occurring. The theater may include airspace, land, and sea that is or that may potentially become involved in war. During war in a theater, the military personnel may find it necessary to receive cargo or ship supplies and cargo from the theater.

Presently, there is no safe means to autonomously deliver or pick up supplies or cargo at military operating bases in the theater. In this regard, there is no system or vehicle that is capable of autonomously loading and unloading cargo or supplies to/from the aircraft without human interaction. That is, there is no system capable of autonomously moving cargo on and off aircraft, both fixed wing and rotary wing aircraft, in an austere environment.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
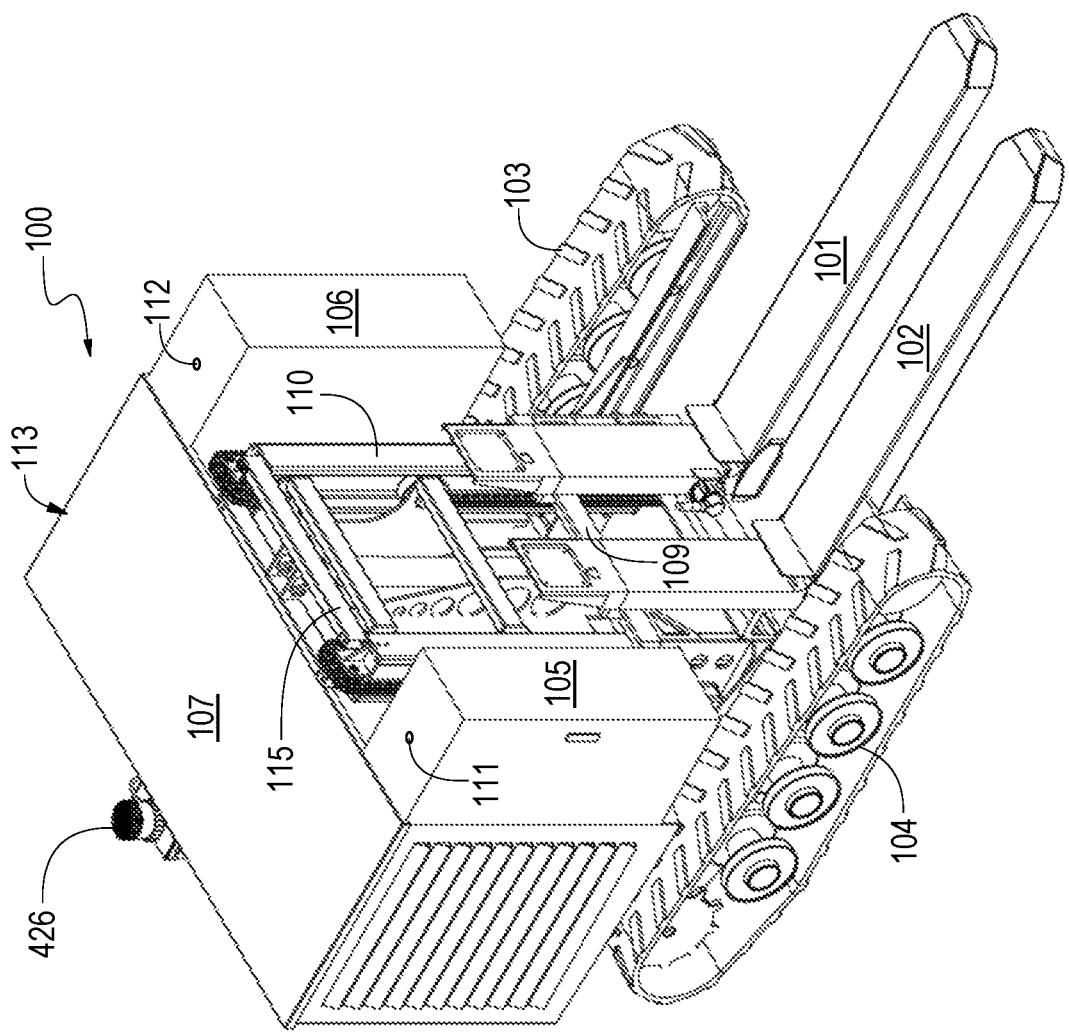
FIG. 1 is a diagram of an exemplary autonomous robotic cargo system (ARCS) in accordance with an embodiment of the present disclosure.

The present disclosure describes an autonomous robotic cargo system (ARCS) robot. The ARCS robot autonomously moves cargo on and off fixed and rotary wing aircraft. The ARCS robot enables our war fighters to move cargo into and out of austere and contested environments with reduced risk and effort. In this regard, the ARCS robot is capable of real time obstacle avoidance, navigation by waypoint and compass heading, self-locating, and entering and exiting the aircraft without any human interaction An exemplary ARCS robot 100 for moving cargo on and off an aircraft in accordance with an embodiment of the present disclosure is depicted in FIG. 1. The ARCS 100 robot 100 comprises a chassis 113. Coupled to the chassis 113 is a pair of tracks 103 and 104. The tracks 103 and 104, when activated, move the ARCS robot 100. The tracks 103 and 104 have the capability to move well in mud and sand. Also, the tracks 103 and 104 have soft surfaces, and the soft surfaces of the tracks 103 and 104 will not damage the interior of an aircraft (not shown) when the ARCS robot 100 moves cargo on and off the aircraft and when the ARCS robot 100 stores itself in the interior of the aircraft.

In one embodiment, the tracks 103 and 104 are operated hydraulically. In this regard, the ARCS robot 100 comprises may comprise two pumps (not shown) on an engine (not shown) and a tank (not shown). The engine creates pressure, which is run through valves to hydraulic motors on the tracks 103 and 104. Further, each track 103 and 104 has an electromechanical valve (not shown) that is controlled by a computing device, described further herein. When actuated, positions the tracks 103 and 104 in a forward or backward moving position. In this regard, one position of the valve causes the tracks 103 and 104 to move forward and another position of the valve causes the tracks 103 and 104 to move backward.

The ARCS robot 100 further comprises cargo lifting and lowering forks 101 and 102. The forks 101 and 102 are coupled to a carriage 109. The forks 101 and 102 are configured and arranged to couple to openings in the cargo (not shown) being transported. In one embodiment, the forks 101 and 102 have a telescoping (in/out) capability. That is, portions of the forks 101 and 102 extend outwardly to aid in positioning the forks 101 and 102 to more effectively pick up cargo in the environment or on the aircraft and more effectively place the cargo in the environment or in the aircraft. Additionally, the forks 101 and 102 are configured to move up and down, in and out and to shift to the left or the right. This allows the ARCS robot 100 to better place cargo in the aircraft.

The ARCS robot 100 further comprises a backrest 110. In this regard, cargo on the forks 101 and 102 rest against the backrest 110 to better secure the cargo to the ARCS robot 100.

The ARCS robot 100 comprises a control box 107 that extends the width of the ARCS robot 100. Within the control box 107 is the engine and the hydraulics system described above. The engine and hydraulic systems are configured to move the tracks 103 and 104 of the ARCS robot 100 backward or forward. Further, the engine and hydraulic systems are configured to move the forks 101 and 102 up or down, in or out, and/or side-to-side to load cargo on the ARCS robot 100 or unload cargo from the ARCS robot 100.

The ARCS robot 100 also comprises electronic boxes 105 and 106 positioned on either side of the forks 101 and 102. Each box 105 and 106 comprises a global positioning system (GPS) antenna 111 and 112, respectively. The GPS antennas 111 and 112 enable the ARCS robot 100 to consistently know its present location. At least one of the electronics boxes 105 or 106 comprises a computing device (not shown). The computing device is any type of a device that comprises operations manager control logic (not shown) that is executed by a processor (not shown) for controlling the ARCS robot 100. Note that the operations manager control logic can be software, hardware, firmware, or combination thereof.

The ARCS robot 100 further comprises a laser scanner 426. The laser scanner 426 rotates and emits light. The laser scanner 426 receives light back. This received light contains distance information about objects in the laser's field of view (FOV). In this regard, the laser scanner 426 determines the distance to the object and the azimuth and elevation of the object. Notably, the laser scanner 426 captures the surface shape of objects (such as vehicles), buildings and landscapes. This information is used by the ARCS robot 100 to identify and avoid obstacles when navigating to its destination.

In operation, the ARCS robot 100 autonomously moves cargo from an aircraft or to an aircraft in an austere (outdoor) environment. It can operate in different modes. First, it can operate in direct drop mode. In this mode, the aircraft operator first opens the aircraft door and extends the retractable aircraft ramp. The ARCS robot 100 then loads cargo in the aircraft with its forks 101 and 102. The ARCS robot 100 exits the aircraft via the aircraft door and aircraft ramp, deposits the cargo on the ground and re-enters the aircraft via the aircraft door and aircraft ramp. The aircraft operator retracts the aircraft ramp and closes the aircraft door. The direct drop mode is described further herein.

In direction and distance mode, the aircraft operator opens the aircraft door and extends the aircraft ramp. The ARCS robot 100 exits the aircraft and travels a pre-determined distance on a compass heading (e.g. 100 meters bearing 230 degrees), which can be predetermined information that is provided the ARCS robot 100 while navigating around obstacles. The ARCS robot 100 navigates around objects using information from its laser scanner 426, GPS antennas 11 and 112, and a camera (not shown). Notably, the laser scanner 426 obtains the distances from objects and the azimuths and elevation of the objects. The ARCS robot 100 then analyzes the laser data with data received from the camera. The cargo is deposited when the robot reaches the specified distance. The ARCS robot 100 then returns and boards the aircraft for the return trip. In one embodiment, the camera is an electro-optical (EO)/infra-red (IR) camera. The camera provides live video which are used by the visual perception algorithms. Visual perception locates the aircraft at the landing site and secondarily locates the cargo door. Note that navigation algorithms will also utilize the camera and laser scanner data together for high resolution localization when the ARCS robot 100 is loading cargo into or removing cargo from the aircraft, and when it is climbing into or out of the aircraft.

In designated point mode, the aircraft operator opens the aircraft door and extends the aircraft ramp. The ARCS robot 100 exits the aircraft via the aircraft door and the extended aircraft ramp, proceeds to a single designated GPS waypoint on a self-generated path, deposits the payload, returns to the aircraft, and boards the aircraft. Note that the GPS waypoint can be physically entered into the ARCS robot 100 or provided electronically. The designated point mode is described further herein.

In designated path mode, the ARCS robot 100 follows a specific path chosen by an operator to a location at which to deliver the cargo. To designate waypoints, the operator can use a laser target designator such as the Common Laser Range Finder Integrated Capability (CLRF-IC) (not shown), or any other laser target designator (LTD) capable of waypoint determination and transmission (not shown), or another similar device. Additionally, manual entry into a graphical user interface (GUI) on a phone/tablet (not shown) can also be used. Regardless of the input device, a specific path from the aircraft to the unloading point is determined by a plurality of waypoints chosen by the operator. In one embodiment, the waypoints are downloaded directly to the ARCS robot 100 via wireless radio link when the aircraft arrives. When the operator gives the command, the ARCS robot 100 exits the aircraft and follows the waypoints to the unloading point. Similarly, the ARCS robot 100 returns to the aircraft upon operator command using the same or a different waypoint designated path. The designated path mode is described further herein.

In manual mode, the ARCS robot 100 can also be operated manually via a hand-held controller (wired or wireless) (not shown) for pre-positioning the ARCS robot 100 or when using the ARCS robot 100 for alternate tasks, such as towing vehicles, small aircraft, or when moving skid loads and other cargo. A single small joystick (not shown) may be used to turn the ARCS robot 100 and move the ARCS robot 100 forward and backward. An additional joystick on the same controller may move the cargo up and down, move it in or out or shift it side to side on the forks 101 and 102.

In follower mode, the aircraft operator opens the aircraft door and extends the aircraft ramp upon arrival. An operator removes the hand controller from the ARCS robot 100. As the operator moves away from the aircraft, the ARCS robot 100 follows at a pre-determined distance and records its path as it moves. The operator uses a button on the hand controller to manipulate the forks to deliver the cargo. If desired, the operator can return the hand controller to the ARCS robot 100 and press an additional button (not shown) to command it to return to the aircraft autonomously. The ARCS robot 100 will use the recorded path to navigate its way back to the aircraft.

Figure 2:
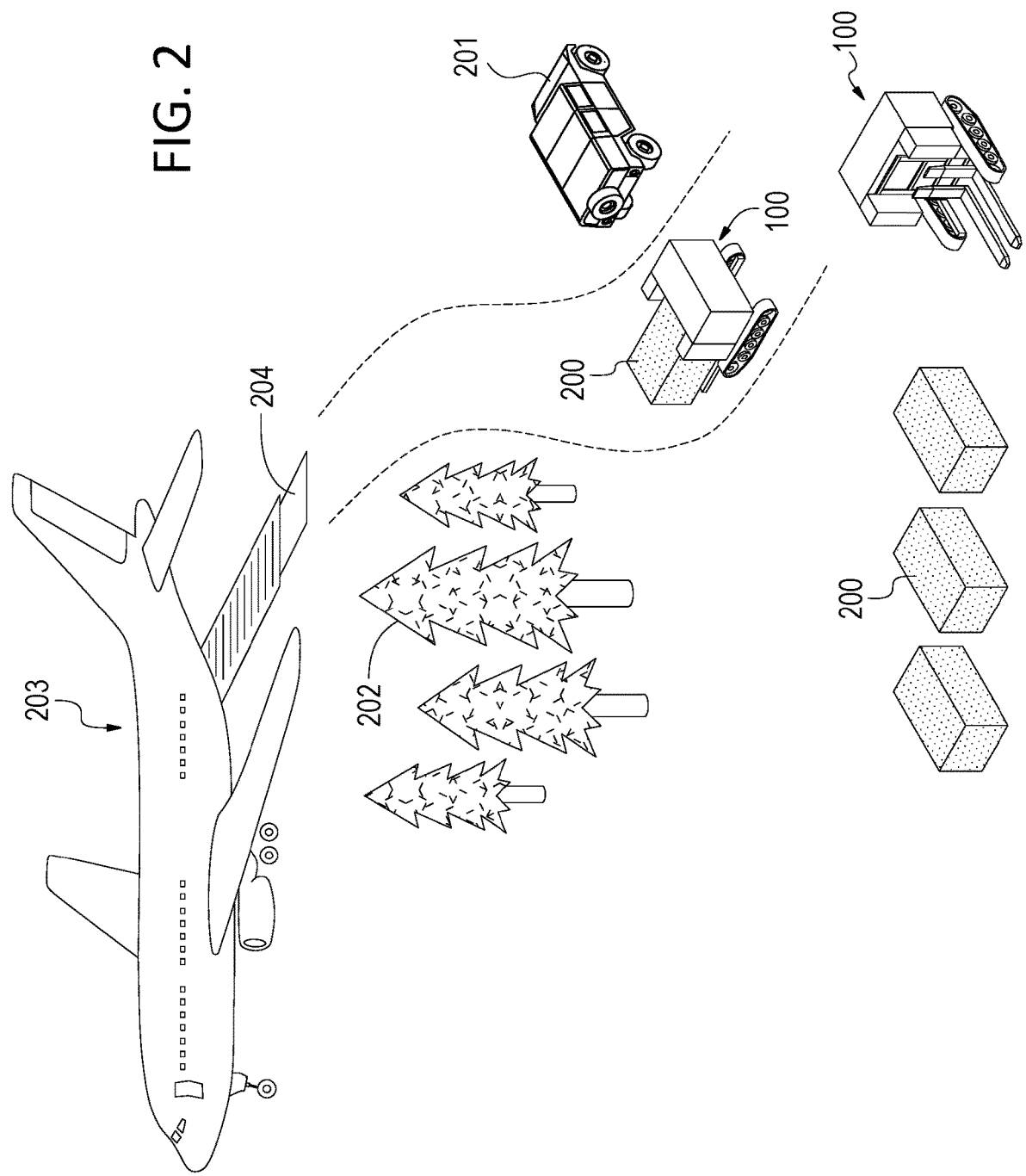
FIG. 2 is an illustration of the movement of the ARCS toward an aircraft.

FIG. 2 is an illustration of the ARCS robot 100 getting cargo 200 from an environment and taking the cargo 200 to the aircraft 203. In this regard, the aircraft operator has opened the aircraft door (not shown) and extended the aircraft ramp 204. The ARCS robot 100 traverses the terrain and picks up the cargo 200 using its two forks 101 and 102. In its return to the aircraft, the ARCS robot 100 determines, based upon laser scanner 426 data and the camera data, that it must move to the right to avoid the trees 202 as it is navigating back to the aircraft. Further, the ARCS robot 100 locates the aircraft 203 based on laser data and/or a video stream from the camera. The ARCS robot 100 also locates the cargo door in a similar manner.

Figure 3:
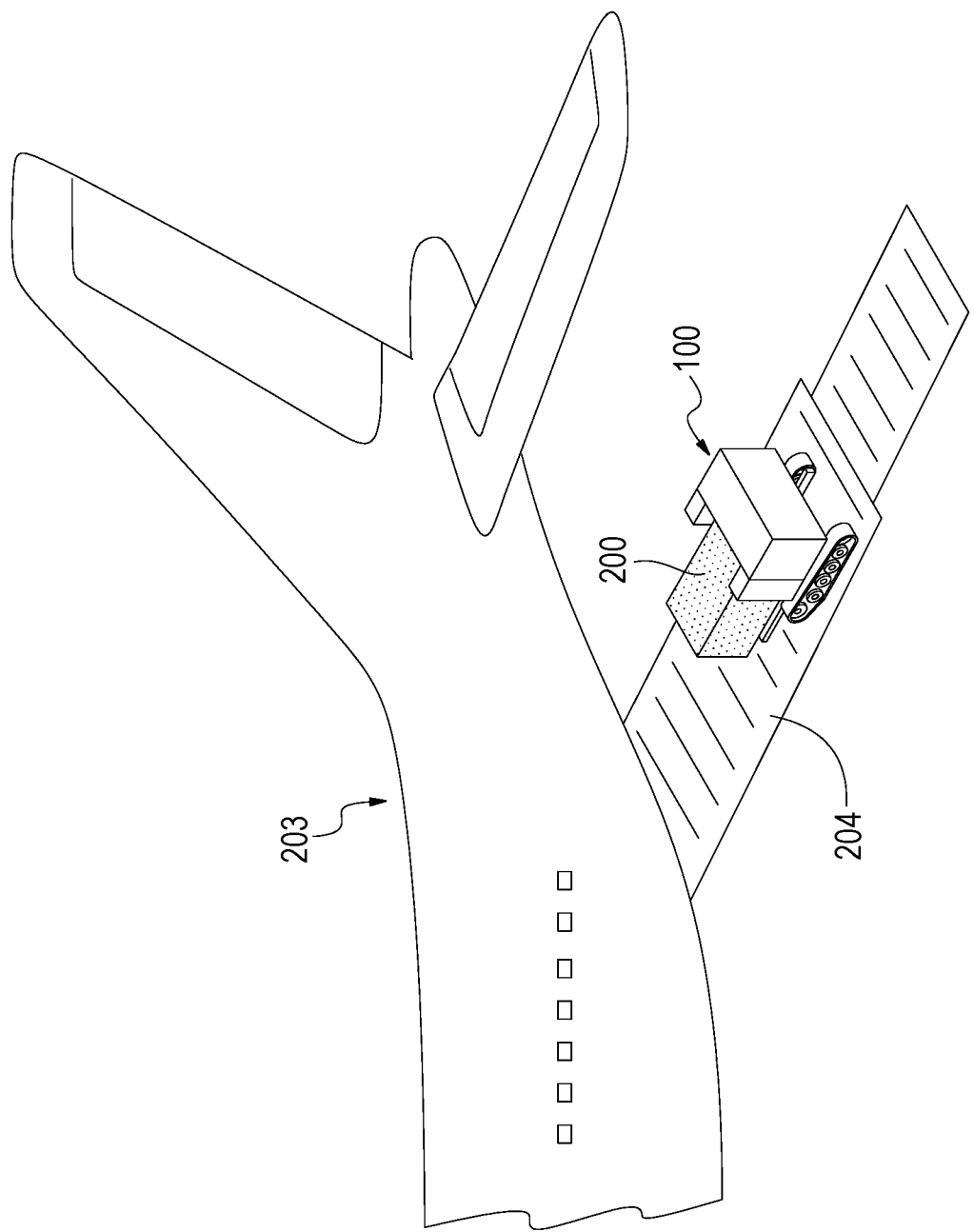
FIG. 3 is an illustration of the ARCS moving up a ramp of the aircraft to deposit cargo.

With reference to FIG. 3, after the ARCS robot 100 navigates itself back to the aircraft 203, the ARCS robot 100 transports itself up the ramp 204 of the aircraft 203 with the cargo 200. Once inside the aircraft, the ARCS 100 autonomously unloads the cargo 200 for storage and parks itself in the interior of the aircraft 203.

Figure 4:
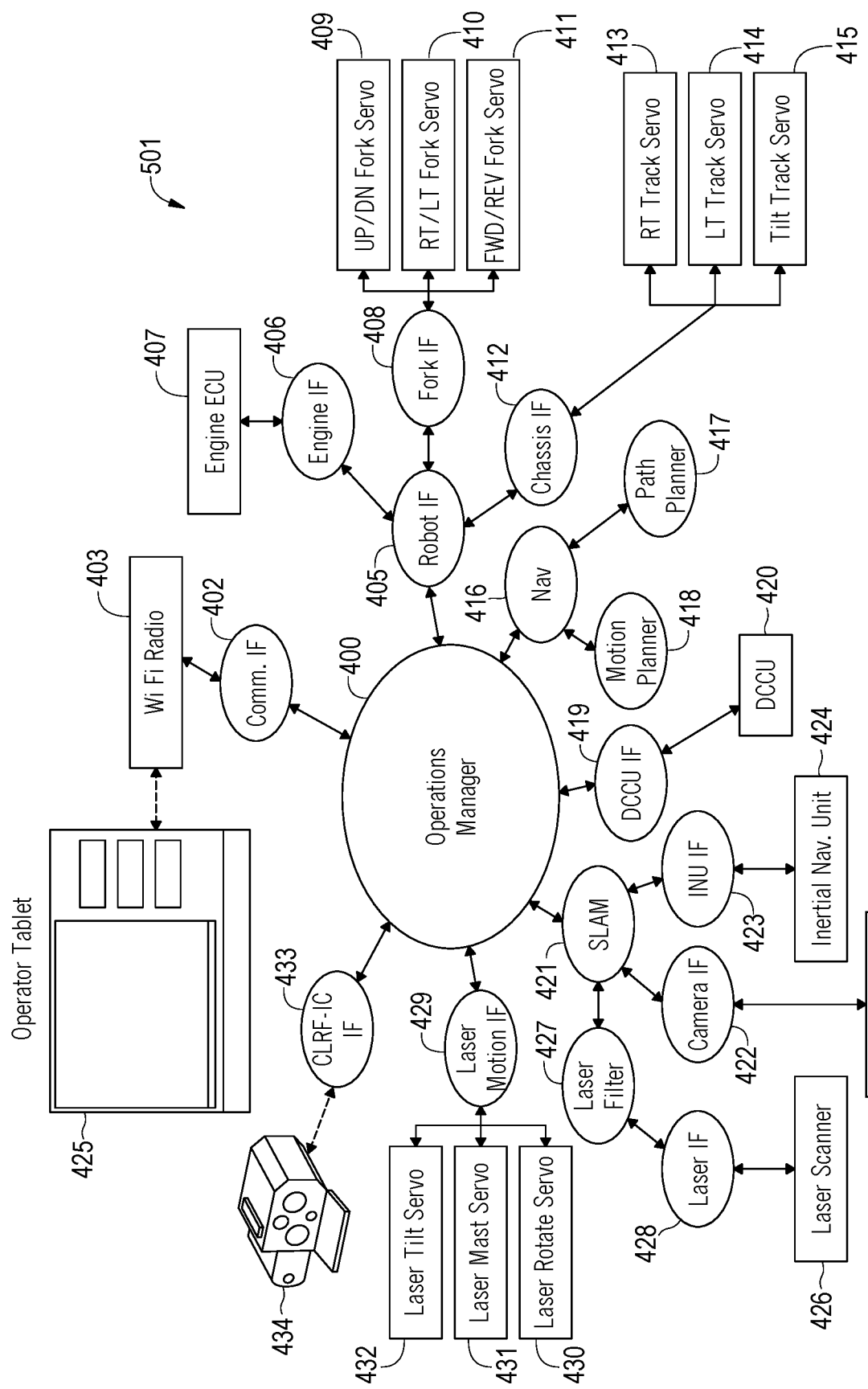
FIG. 4 is a diagram of hardware of the ARCS and its corresponding software component where each software component communicatively couples to an operations manager software controller.

FIG. 4 is a diagram of an exemplary ARCS robot system 501 that includes both hardware and software components of the ARCS robot system 501. Note that the hardware components are represented either by a rectangle or a drawing of the hardware unit. The software components are represented by ovals. Note that the software components may include software, hardware, firmware, or a combination thereof in other embodiments.

The central controller of the ARCS robot system 501 is the operations manager 400 found in the center of the diagram depicting the ARCS robot system 501. The operations manager 400 receives information from the software components of the ARCS robot system 501 and acts accordingly.

In this regard, the operations manager 400 receives data indicative of a pathway and motion of the ARCS robot 100 (FIG. 1) and by controlling the tracks 103 (FIG. 1) and 104 (FIG. 1) moves the ARCS robot 100 along the provided pathway. Further, the operations manager 400 may receive real-time data indicative of the environment of the ARCS robot 100, and the operations manager 400 moves the ARCS robot 100 accordingly.

Further, the operations manager 400 may receive data indicative of cargo to load or unload, including a load or unload location. In response, the operations manager 400 activates the forks 101 (FIG. 1) and 102 (FIG. 2) to load or unload cargo.

The ARCS robot system 501 comprises a right (RT) track servo 413 that controls the right track 104 (FIG. 1). Further, the ARCS robot 100 has a left (LT) track servo 414 that controls the left track 103 (FIG. 1) and a Tilt Track Servo 415 that controls the tilting of the tracks 103 and 104. Note that tilting of the tracks 101 and 102 allows the ARCS robot 100 to traverse larger obstacles. By modifying the track so that it tilts up approximately 10 degrees, for example, the tracks 101 and 102 can get an initial grip on steep rocks or other obstructions that might otherwise require recalculation of the ARCS robot's path.

The RT Track Servo 413, the LT Track Servo 414, and the Tilt Track Servo 415 interface with the chassis interface 412, which interfaces with the robot interface 405. The robot interface 405 communicates with the operations manager 400. Accordingly, the RT Track Servo 413, the LT Track Servo 414, and the Tilt Track Servo 415 bi-directionally communicates with the chassis interface 412, and the chassis interface 41 bi-directionally communicates with the robot interface 405. The robot interface 405 bi-directionally communicates with the operations manager 400. Thus, if the operations manager 400 determines that the tracks 103 and 104 should move forward based upon pathway information, motion information or real-time data about the environment, the operations manager 400 transmits data indicative of movement (forward or reverse) of the tracks 103 and 104 to the robot interface 405, which transmits the data to the chassis interface 412. The chassis interface 412 commands the tracks 103 and 104 to move forward or in reverse based upon the data received from the operations manager 400.

The ARCS robot system 501 comprises an up and down (UP/DN) fork servo 409 that controls the movement of the forks 101 (FIG. 1) and 102 (FIG. 1) in an up or down direction. Further, the ARCS robot 100 has a right and left (RT/LT) fork servo 410 that controls movement of the forks 101 (FIG. 1) and 102 (FIG. 1) to the right or to the left and a tilt track servo 415 that controls the tilting of the tracks, for example to get over obstacles without changing the ARCS robot's pathway. The RT track servo 413, the LT track servo 414, and the tilt track servo 415 interface with the chassis interface 412, which interfaces with the robot interface 405. The robot interface 405 communicates with the operations manager 400. Accordingly, the UP/DN fork servo 409, the RT/LT fork servo 410, and the tilt track servo 415 bi-directionally communicates with the fork interface 408, and the fork interface 408 bi-directionally communicates with the robot interface 405. The robot interface 405 bi-directionally communicates with the operations manager 400.

Thus, if the operations manager determines that the forks should pick up cargo, the operations manager 400 transmits data indicative of movement of the forks 101 and 102 to the robot interface 405, which transmits the data to the fork interface 408. The fork interface 408 commands the servos 409-411 to activate to pick up the cargo based upon the data received from the operations manager 400.

The ARCS robot system 501 further comprises at least one wireless fidelity (WI-FI) radio 403. The WI-FI radio 403 can receive data from another WI-FI radio in the field. As an example, the WI-FI radio 403 communicates with an operator tablet 425. Data received by the WI-FI radio 403 is transmitted to the operations manager 400 via a communications interface 402. Accordingly, the WI-FI radio 403 bi-directionally communicates with the communication interface 402. The communication interface 402 bi-directionally communicates with the operations manager 400. The WI-FI radio 403 may also receive signals from a hand controller.

The ARCS robot system 501 further can communicate with a common laser range finder-integrated capability (CLRF-IC) 434. In this regard, the ARCS robot 100 comprises a CLRF-IC interface 433 that bi-directionally with the CLRF-IC 434 and the operations manager 400. In one embodiment, the operator of the CLRF-IC 434 uses the CLRF-IC to designate a specific pathway by defining waypoints along the pathway for the ARCS robot system 501 to traverse from one waypoint to another. In such a scenario, an operator (not shown) of the CLRF-IC 434 identifies waypoints and transmits data indicative of the waypoints through the CLRF-IC interface 433 to the operations manager 400, which can use the waypoints as a pathway for the ARCS robot 100.

The ARCS robot system 501 further comprises a laser tilt servo 432, a laser mast servo 431, and a laser rotate servo 430. These three components may be manipulated by the operations manager 400 via the laser motion interface 429 to position the laser in such a way as to collect data indicative of object and terrain in the environment of the ARCS robot 100.

The ARCS robot system 501 further comprises a digitally controlled charging unit (DCCU) 420. The DCCU communicates with the operations manager 400 via a DCCU interface 419. The purpose of the DCCU is to replenish electrical charge in the battery of the robot 100 (not shown).

The ARCS robot system 501 further comprises a navigation system 416 that is fed data by the motion planner 418 and the path planner 417. Note that the navigation system 416 uses algorithms with data from the EO/IR camera 425 and the laser for high resolution localization when the robot is loading cargo into or removing it from the aircraft, and when it is moving into and out of the aircraft. The motion planner 418 determines a valid configuration for moving the ARCS robot 100 to an identified waypoint. Notably, the configuration shall include moving around obstacles. The path planner 417 provides data to navigation 416 indicative of the shortest or otherwise optimal path between the waypoints identified by the motion planner 418. Navigation 416 provides this data to the operations manager that operates the ARCS robot system 501 accordingly.

Additionally, the ARCS robot system 501 comprises simultaneous location and mapping (SLAM) 421. The SLAM 421 receives data indicative of objects and terrain from the laser scanner 426 through a laser interface 428 and a laser filter 427. The SLAM 421 receives data indicative of the environment in the FOV of an electro-optic/infra-red camera 425 via a camera interface 422, and the SLAM receives data indicative of the ARCS robot's location from an inertial navigation unit 424 via an inertial navigation unit interface 423. Using the data received, the SLAM 421 provides real-time location data, obstacle data, position data, and the like of the ARCS robot 100 to the operations manager 400. Accordingly, the laser scanner 426 bi-directionally communicates with the laser interface 426, and the laser interface 428 bi-directionally communicates with the laser filter 427, which bi-directionally communicates with the operations manager 400. Further, the camera 425 bi-directionally communicates with the camera interface 422, and the camera interface 422 bi-directionally communicates with the operations manager 400. The inertial navigation unit 424 bi-directionally communicates with the inertial navigation unit interface 423, which bi-directionally communicates with the operations manager 400. Thus, the operations manager 400 may receive data indicative of the environment of the ARCS robot 100 in real-time and adjust the pathway of the ARCS robot 100 to avoid obstacles.

The ARCS robot system 501 further comprises a laser tilt servo 432, a laser mast servo 431, and a laser rotate servo 430. The laser motion interface 429 bi-directionally communicates with the laser tilt servo 432, the laser mast servo 431, and the laser rotate servo 430. Further, the laser motion interface 429 bi-directionally communicates with the operations manager 400. In this regard, the laser motion interface 429 operates the laser tilt servo 432, the laser mast servo 431, and the laser rotate servo 430 in order to effectively position the laser to obtain effective laser traces of the environment in which the ARCS robot 100 is operating based upon data received from the operations manager 400. Note that the laser motion interface 429 may be hardware, software, firmware, or a combination thereof that communicatively couples the laser motion interface 429 operates the tilt servo 432, the laser mat servo 431 with the operations manager control logic 400.

Figure 5:
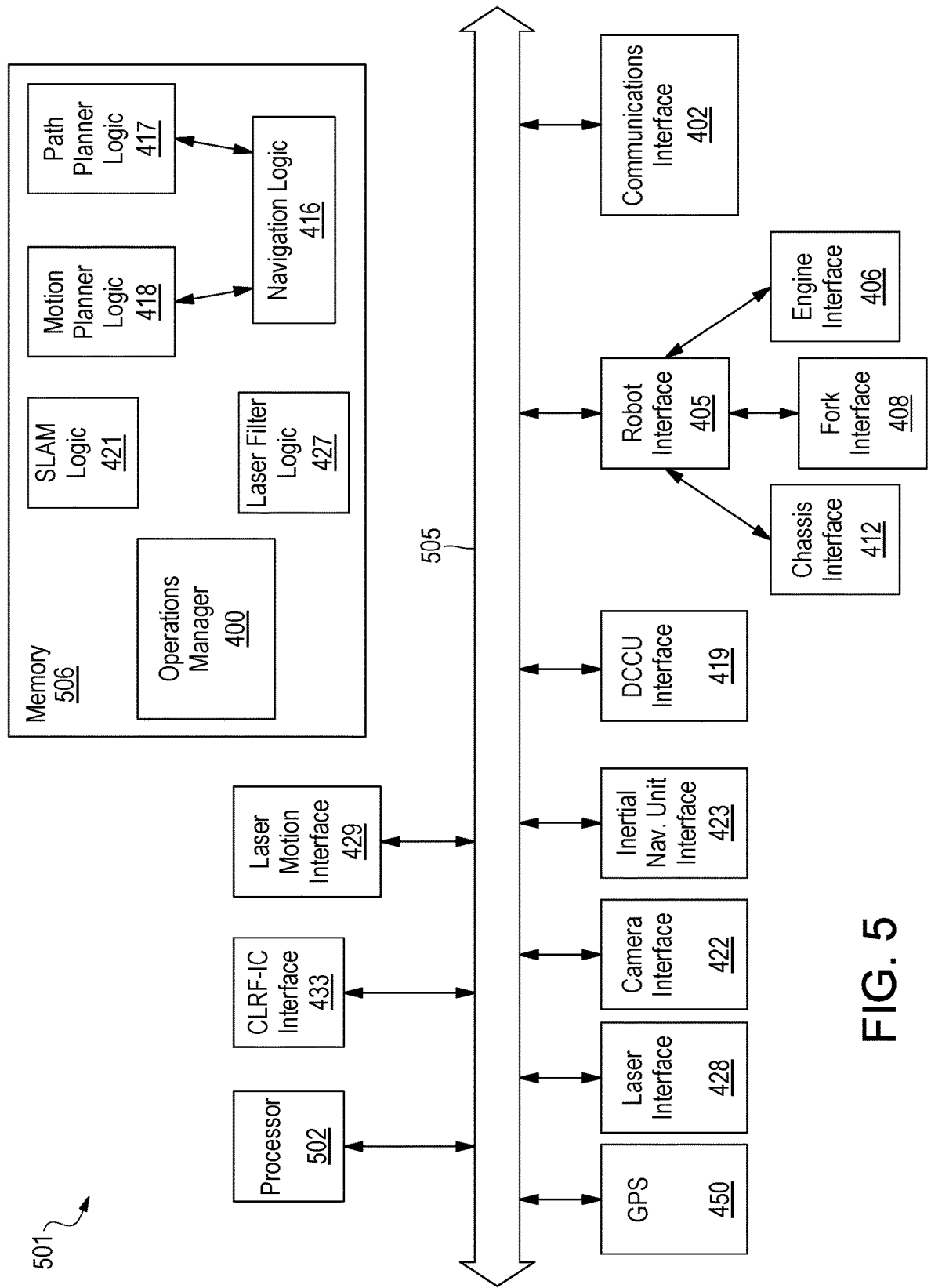
FIG. 5 is a block diagram of an exemplary system of the ARCS.

FIG. 5 is a block diagram of an exemplary embodiment of the ARCS robot system 501 in accordance with an embodiment of the present disclosure. The ARCS robot system 501 carries a wide range of cargo on and off a variety of aircraft, depositing it on the aircraft and depositing at a safe point some distance from the aircraft in an austere environment. The ARCS system 100 safely hauls a variety of standard cargo payloads, as well as non-standard payloads such as food, fuel and water, and human casualties during evacuation missions (CASEVAC).

The exemplary embodiment of the ARCS robot system 501 depicted by FIG. 5 comprises at least one conventional processor 502, such as a Digital Signal Processor (DSP) or a Central Processing Unit (CPU), that communicates to and drives the other elements within the ARCS robot system 501 via a local interface 505, which can include at least one bus. Further, the processor 502 is configured to execute instructions of software, such as operations manager 400, the laser filter logic 427, the simultaneous localization and mapping (SLAM) logic 421, the navigation logic 416, the motion planner logic 418, and the path planner logic 417. The operations manager 400 is a central module that interfaces and communicates with the other software modules in one embodiment. Further, the operations manager 400 may control data flow and final decision making. Note that the operations manager 400, the laser filter logic 427, the SLAM logic 421, the navigation logic 416, the motion planner logic 418, and the path planner logic 417 may be software, hardware, firmware, or any combination thereof.

The laser motion interface 429 is communicatively coupled to the laser tilt servo 432 (FIG. 4), the laser mast servo 431 (FIG. 4), and the laser rotate servo 430 (FIG. 4). In this regard, the laser motion interface 400 operates the tilt servo 432, the laser mat servo 431, and the laser rotate servo 430 in order to effectively position the laser to obtain effective laser traces of the environment in which the ARCS robot 100 is operating. Note that the laser motion interface 400 may be hardware, software, firmware, or a combination thereof that communicatively couples the laser motion interface 400, and operates the tilt servo 432, the laser mast servo 431, and laser rotate servo 430, via the operations manager control logic 400.

In operation, the laser scanner 426 (FIG. 4) of the ARCS robot 100 scans at an angular resolution of 0.33 degrees and can scan 180 degrees every 67 msec. At a scanning range of 32.28 ft. (10 m), simple trigonometry indicates that any obstacle larger than 2.27 in. (57.6 mmm) can be reliably detected by a single horizontal scan. Further note that the laser motion interface 429 receives data indicative of laser traces. The laser traces may be data indicative of an austere environment with varying terrain, trees, and other objects through which the ARCS robot 100 is moving. However, the laser interface 429 may also receive data indicative of more rugged terrain that includes characteristics such as ruts, holes, rocks, and inclines. This information is provided to the operations manager control logic 400 for use in determining a pathway for the ARCS robot 100 and for avoiding objects as the ARCS robot 100 is in motion.

The navigation logic 416 determines the most direct path from the initial position of the ARCS robot 100 to its destination, whether it be on the aircraft or in the environment. In this regard, the navigation logic 416 receives information from SLAM indicative of a map that comprises the effective pathway for movement of the ARCS robot 100. Further, the navigation logic 416 uses data received from a global positioning system (GPS) 450. Using the data received, the motion planner logic 418 can generate data indicative of motions the ARCS robot 100 takes to go from an initial position to a destination. Further, the path planner logic 417 generates the most efficient path for moving the ARCS robot 100 to its destination.

The SLAM logic 421 provides local environmental awareness, as well as simultaneous location, obstacle detection, and navigation mapping information for the ARCS robot 100. SLAM data is used to inform the navigation and obstacle avoidance algorithms during path planning and when positioning itself and its payload inside the aircraft. Using SLAM data, the ARCS robot 100 navigates from the aircraft to any designated cargo drop off point and back again—even in rugged terrain. Note that SLAM provides the information required by the obstacle avoidance and navigation algorithms to locate the ARCS robot 100 in the real environment and map that environment at the same time. The map is a three-dimensional representation of the environment immediately surrounding the ARCS robot 100. Further note that the three-dimensional map may be displayed on a handheld device, e.g., a tablet, which is described further herein.

The SLAM logic 421 (FIG. 4) receives inputs from the laser scanner 426, the electro-optical (EO)/infra-red (IR) camera 425, and the inertial navigation unit 424 in order to provide local environmental awareness, simultaneous location, obstacle detection and avoidance, and navigation capability for an ARCS robot 100. In this regard, the SLAM logic 421 receives data indicative of objects within the FOV of the laser scanner 426 (FIG. 4) by capturing data indicative of physical objects, their exact sizes, and shapes. Notably, the laser scanner 426 generates "point clouds" of data from the surface of objects in its FOV. In other words, the laser scanner 426 is a three-dimensional data collector and this is how the laser scanner 426 provides data indicative of physical object's exact size and shape as a digital 3-dimensional representation.

The SLAM logic 421 uses the data collected to generate a digital 3-dimensional representation of the terrain. The data is received from the laser interface 428 and the laser filter 427. The Laser Filter 427 rejects a wavelength or a range of wavelengths while transmitting desired wavelengths. The laser filter 427 includes digital filters implemented in software algorithms such as noise reduction, down-sampling, bandpass, long-pass, or notch.

Further, the SLAM logic 421 logic receives data indicative of video images of the surrounding terrain form the EO/IR camera 425 (FIG. 4) via the camera interface 422. The EO/IR camera 425 spans both visible and infrared wavelengths. Because the EO/IR camera 425 spans both visible and infrared wavelengths, the EO/IR camera 425 provides total situational awareness in both day and night and in low light conditions. Data indicative of the video captured by the EO/IR camera 425 is transmitted to the camera interface 422 and the SLAM logic 421. The SLAM logic 421 combines the EO/IR camera 425 data with laser scanner 426 data to generate the 3D map.

The SLAM logic 421 further receives data from the inertial navigation unit (INU) 424 via the inertial navigation unit interface 423. The INU is a device that uses a processor, motion sensors (accelerometers) and GPS to continuously calculate the ARCS robot 100 position, orientation, and velocity (direction and speed of movement) without the need for external references. Dead reckoning is used when GPS data is not available due to signal blockage from the environment. Dead reckoning is a process used to estimate the ARCS robot's current position by using a previously determined position, and advancing the position of the ARCS robot 100 based upon known or estimated speeds and accelerations over elapsed time and course of the ARCS robot 100 without the need for external references.

Note that the INU has an internal inertial measurement unit (IMU) which measures accelerations in 3 dimensions, a GPS receiver, and a small computer. The software and hardware on the computer use information from IMU and the GPS receiver to generate the location and pose of the ARCS robot 100 and provide it to the path planning algorithms (and other parts of the software that may care about the location). When GPS is blocked by trees or some other obstacle, the INU relies more heavily on the IMU accelerometers to do dead reckoning to provide an estimate of the robot's location.

Accordingly, the SLAM logic 421 is the process of creating and continually updating a map using laser scanner 426, EO/IR camera 425 and INU 424 data collected by the ARCS robot 100. The map is used by the ARCS robot 11 to navigate the terrain while the ARCS robot 100 is simultaneously updating the map with new laser and camera data. In this regard, the ARCS robot 100 plots a pathway in an environment, but at the same time, the ARCS robot 100 also continuously updates its location iii the world and in the map environment. The process of SLAM logic 421 uses is a complex array of computations, algorithms, and inputs from the laser scanner 426, the EO/IR camera 42 and the inertial navigation unit 424 to generate the map of its previously unknown environment. As the SLAM logic 421 is generating the map and the ARCS robot 100 is traversing the environment, the SLAM logic 421 provides the data indicative of the map to the operations manager control logic 400.

The robot interface 405 is communicatively coupled to the engine interface 406, the fork interface 408, and the chassis interface 412. The robot interface transmits control data to the fork interfaces 409, 410, and 411, and the chassis interface 412 to control the fork servos 409-411, and the track servos 413-415.

Notably, the robot interface 405 controls movement of the ARCS robot 100. In this regard, the navigation logic 416 determines to where the ARCS robot 100 will move and what movements are needed to move the ARCS robot 100 to the location identified. The operations manager control logic 400 transmits data indicative of the path and the movement(s) to the robot interface 405 for moving the ARCS robot to the location. The navigation logic 415 uses data indicative of the three-dimensional terrain map generated by the SLAM logic 421 to calculate a waypoint navigation plan and track motion commands to move the ARCS robot 100 over the terrain without incident.

In response, the robot interface 405 activates the engine 407 (FIG. 4) via the engine interface 406. After activating the engine 407, the robot interface 405 activates the right track servo 413, the left track servo 414, and tilt track servo 415 for moving the ARCS robot 100 via the chassis interface 412. As the ARCS robot 100 is traversing the terrain, the operations manager control logic 400 continues to transmit data indicative of a pathway and movement obtained from the navigation logic 416 to move the ARCS robot 100. This continues until the ARCS robot 100 has reached its destination, which can be in the environment or on an aircraft.

Further, the robot interface 405 transmits data indicative of movement to the up and down (UP/DN) fork servo 409, the right and left (RT/LT) fork servo 410, and the forward and reverse (FWD/REV) fork servo 411. In this manner, the operations management control logic 400 may receive data from the navigation logic 416 indicating a location of a payload relative to the ARCS robot 100. Based upon the ARCS robot's current location, the operations management control logic 400 transmits data to the robot interface 405 to control the movement of the right (RT) track servo 413, the left (LT) track servo 414 and the tilt track servo 415 to move the tracks 101 (FIG. 1) and 102 (FIG. 2) of the ARCS robot 100 such that the ARCS robot 100 is positioned to seize the payload and lift the payload for moving. The operations manager control logic 400 moves the UP/DN fork servo 409, the RT/LT fork servo 410, and the FWD/REV fork servo in a manner that enables the ARCS robot 100 pick up the payload with the forks 101 (FIG. 1) and 102 (FIG. 2).

The DCCU interface 419 is communicatively coupled to a DCCU. Through the DCCU interface 419, the operations manager control logic 400 can digitally control the DCCU 420 (FIG. 4). In this regard, the operations manager control logic 400 can transmit commands to the DCCU 420 to charge a battery on the ARCS 100, stabilize the charging rate of the battery, or terminate charging of the battery.

In one embodiment, the ARCS robot system 501 further comprises the communication interface 402. The communication interface 402 is communicatively coupled to a communication device 403. The communication device 403 is configured to communicate with remote devices, such as cellular devices, tablets, laptops, or personal computers. In one embodiment, the communication device is a wireless fidelity (W-Fi) device that communicates via radio with remote devices. In FIG. 4, the communication device 403 is communicatively coupled to an operator tablet 425; however, the operator tablet may be other types of devices in other embodiments.

The CLRF-IC interface 433 is communicatively coupled to the CLRF-IC 434 (FIG. 4). In this regard, a user of the CLRF-IC 434 can transmit data to the operations manager control logic 400. Note that a CLRF-IC 434 may comprise a high-definition camera (not shown), a short wave infra-red camera (not shown), a laser range finder (not shown), a compass, and/or a GPS. Using the CLRF-IC 434, an operator can designate waypoints along a pathway for the ARCS robot 100. This is described further herein. Data indicative of the waypoints is transmitted to the operations manager control logic 400 and can operate the ARCS robot 100 along the designated path using the navigation logic 416 and controlling the fork 101 and 102 and the tracks 103 and 104. Note that a waypoint may be identified by the CLRF-IC 434, and data indicative of the waypoint is transmitted to the CLRF-IC interface 433, which communicates with the operations manager control logic 400.

As described herein, the SLAM logic 421 automatically maps its surroundings. Thus, the SLAM logic 421 automatically maps an interior of any aircraft and detects and avoids people, other robots, and any other obstacles to ensure safe and reliable ingress/egress of the aircraft. The ARCS robot 100 can operate in five (5) cargo transport modes, which are described herein.

Figure 6:
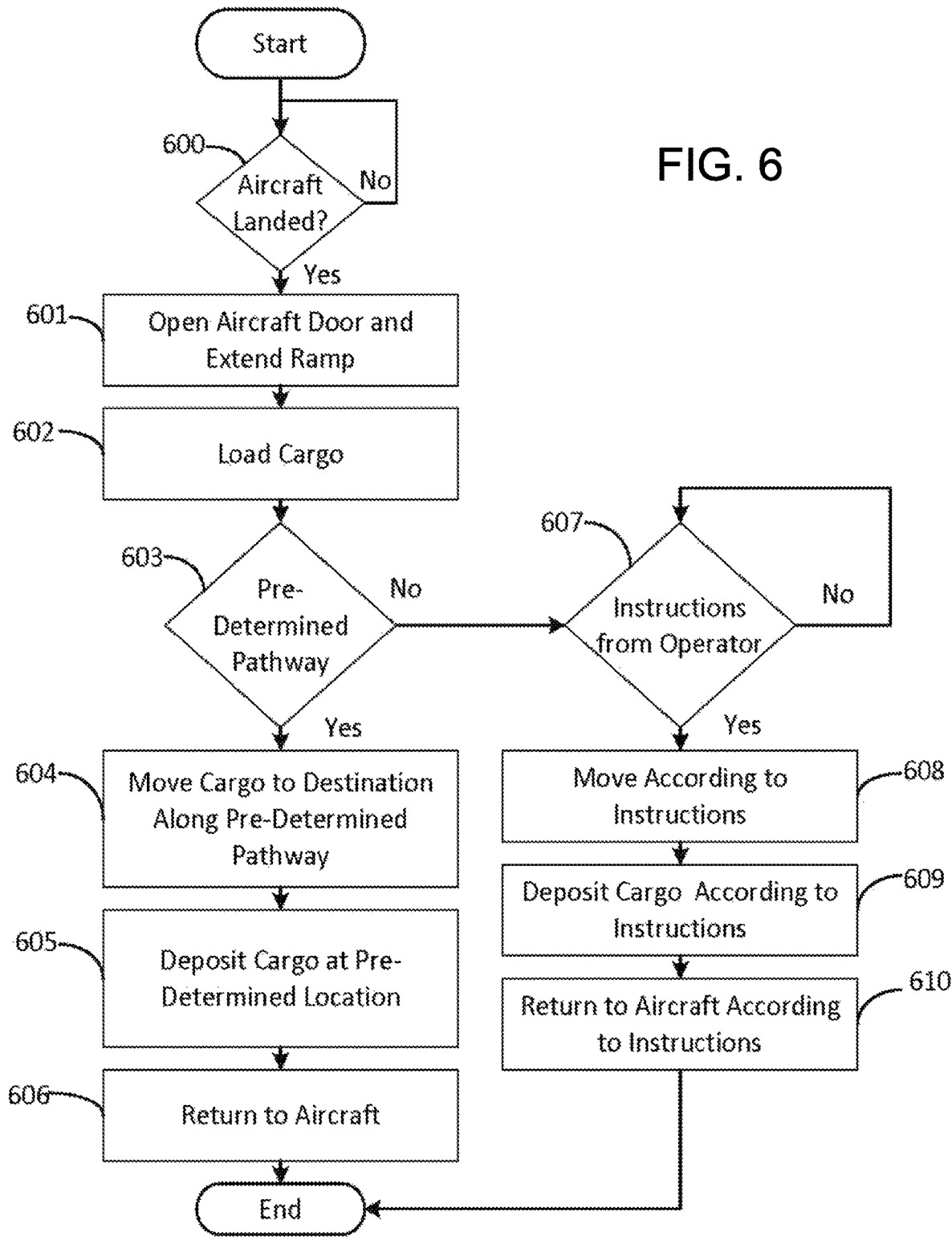
FIG. 6 is a flowchart depicting exemplary architecture and functionality of the ARCS depicted in FIG. 1.

FIG. 6 is a flowchart depicting the architecture and functionality of the ARCS robot system 501 in accordance with an embodiment of the present disclosure.

In step 600, when the aircraft 203 (FIG. 2) lands, the aircraft operator opens the aircraft door and extends the aircraft ramp in step 601. Note that the ARCS robot 100 (FIG. 1) is on the aircraft with the cargo. The operations manager 400 controls fork 101 (FIG. 1) and fork 102 (FIG. 1) of the ARCS robot 100, and uses fork 101 and fork 102 to pick up the cargo that is to be deposited in the austere environment where the aircraft has landed in step 602.

If there is a pre-determined pathway in step 603, for example an operator has selected waypoints defining a pathway for the ARCS robot 100, the operations manager 400 moves the tracks 103 (FIG. 1) and 104 (FIG. 1) of the ARCS robot 100 along the predetermined pathway in step 604 and controlling the forks 101 and 102, deposits the cargo at a pre-determined location in step 605.

Once the cargo is deposited, the operations manager 400 moves the tracks 103 and 104 to direct the ARCS robot 100 back to the aircraft in step 606.

If there is not a pre-determined pathway in step 603, the ARCS robot 100 waits for instructions in step 607. If instructions are provided, the operations manager 400 moves the tracks 103 and 104 according to the instructions in step 608.

In step 609, the operations manager 400 actives the forks 101 and 102 to deposit the cargo according to instructions received. After the cargo is deposited, the operations manager 400 moves the ARCS robot 100 back to the aircraft 203.

Figure 7:
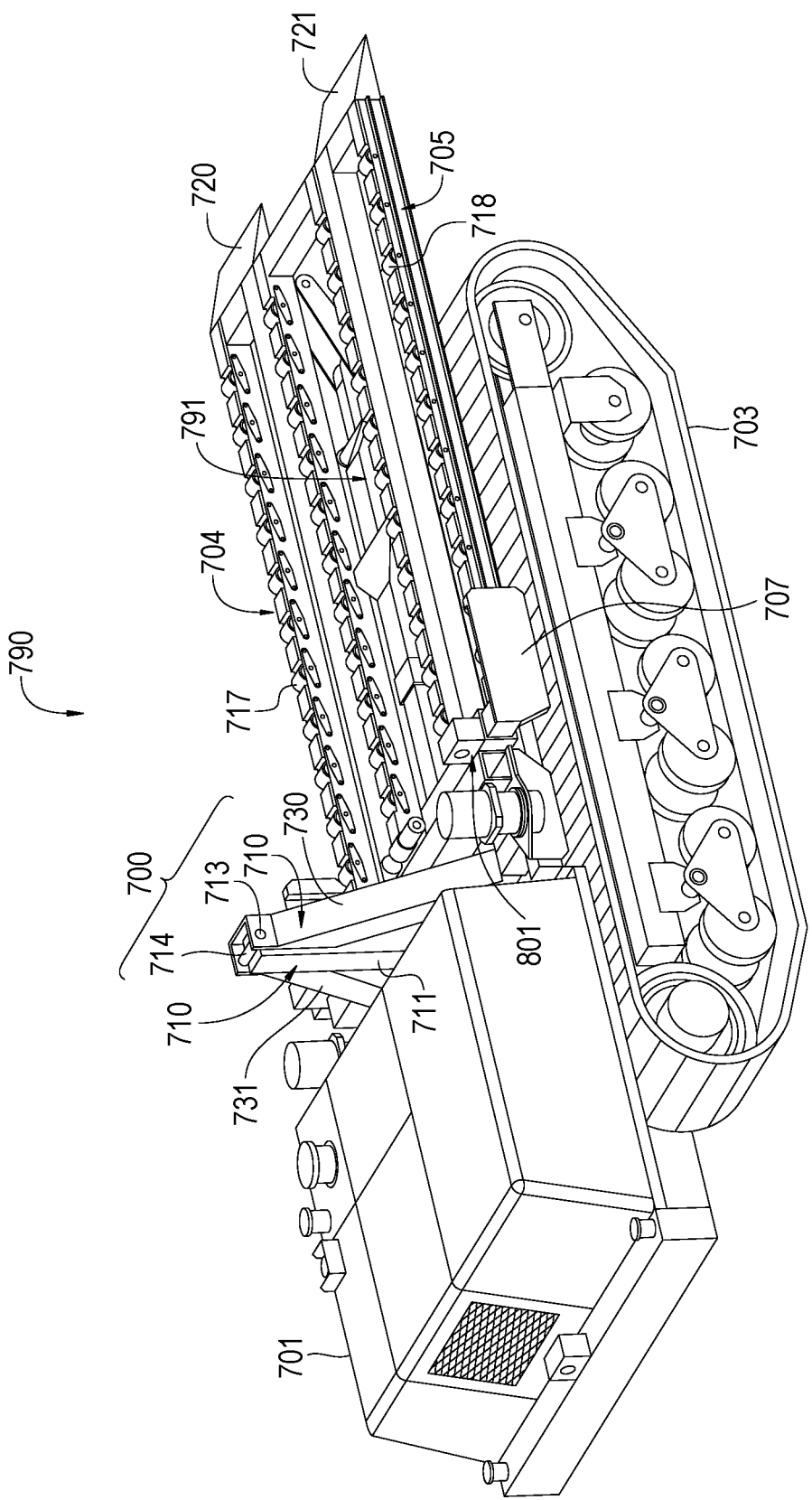
FIG. 7 is another exemplary autonomous robotic cargo system (ARCS) in accordance with another embodiment of the present disclosure.

FIG. 7 is another exemplary autonomous robotic cargo system (ARCS) 790 in accordance with another embodiment of the present disclosure. The ARCS 790 comprises a chassis 701 on a first end of the ARCS 790. The chassis 701 houses electronic, electrical, and mechanical parts used by the ARCS 790 to grasp a load (not shown) and move the load onto a flatbed 791 of the ARCS 790. Further, the ARCS 790 comprises a right track 703 and a left track (not shown) that move the ARCS 790 multidirectional.

The ARCS 790 comprises a left roller fork 704 that is situated atop the flatbed 791. The left roller fork 704 comprises a plurality of rollers 717 for easily moving the load onto the fork 704. Further, the ARCS 790 comprises a right roller fork 705 that is situated beside the left roller fork 704 and atop the flatbed 791. The right roller fork 705 comprises a plurality of rollers 718 for easily moving the load onto the fork 705. In operation, the left roller fork 704 and the right roller fork 705 move outwardly away from the chassis 701 and parallel to the bed 791 of the ARCS 790. This is described further herein.

The left roller fork 704 comprises an end blade 720. The end blade 720 smoothly eases underneath the load so that the remainder of the left roller fork 704 can slide underneath the load. Further, the right roller fork 705 comprises an end blade 721. The end blade 721 smoothly eases underneath the load so that the remainder of the right roller fork 705 can slide underneath the load.

The ARCS 790 further comprises a moveable bar 801. The moveable bar 801 extends laterally across the ARCS 790. As will be described further herein, the moveable bar 801 moves outwardly away from the chassis 701 when a load is being picked up. The moveable bar 801 comprises a right gripping plate 707 and a left gripping plate 810 (not shown). When the bar 801 reaches the load, the right gripping plate 707 and the left gripping plate 810 comprise inward protrusions that grasp openings in a pallet on which a load is situated. The moveable bar 801 proceeds to move back onto the bed 791 of the ARCS 790 and pulls the load over the left roller fork 704 and right roller fork 705 prior to lifting the forks 704 and 705 and the load onto the bed 791.

The ARCS 790 further comprises an actuation mechanism 700. The actuation mechanism 700 moves the bar 801 and the forks 704 and 705 such that the bar 801 and the forks 704 and 705 are situated to access the load, pick up the load, and move the load onto the bed of the ARCS 790.

The actuation mechanism 700 comprises a central bar 711. The central bar 711 is rotatably coupled to a substantially triangular member 710 that comprises a left side arm 731 and a right side arm 730. The substantially triangular member 710 is rotatably coupled to a rotating pin 714 at pivot point 713. Further, the substantially triangular member 710 is fixedly coupled to the left roller fork 704 and the right roller fork 705. In operation, the actuation mechanism 700 expands via the aid of a hydraulic cylinder (not shown), which is described further herein.

The central bar 711 is fixedly coupled to a lateral arm (not shown), which is stowed in the bed 791 of the ARCS 790, which is described further herein. The hydraulic cylinder (not shown) is rotatably coupled to the lateral arm. When the hydraulic cylinder activates, it provides mechanical force in a linear motion to the lateral arm. As the lateral arm moves under the force of the hydraulic cylinder, the central bar 711 moves upward and laterally. As the central bar 711 moves upward and laterally, the triangular member 710 pivots about the pivot point 713 thereby moving the left roller fork 704 and the right roller fork 705 until the left roller fork 704 and the right roller fork 705 are parallel with the ground and the blades 720 and 721 slide under the pallet 901 (FIG. 10) holding the load. The process is further described herein.

Figure 8:
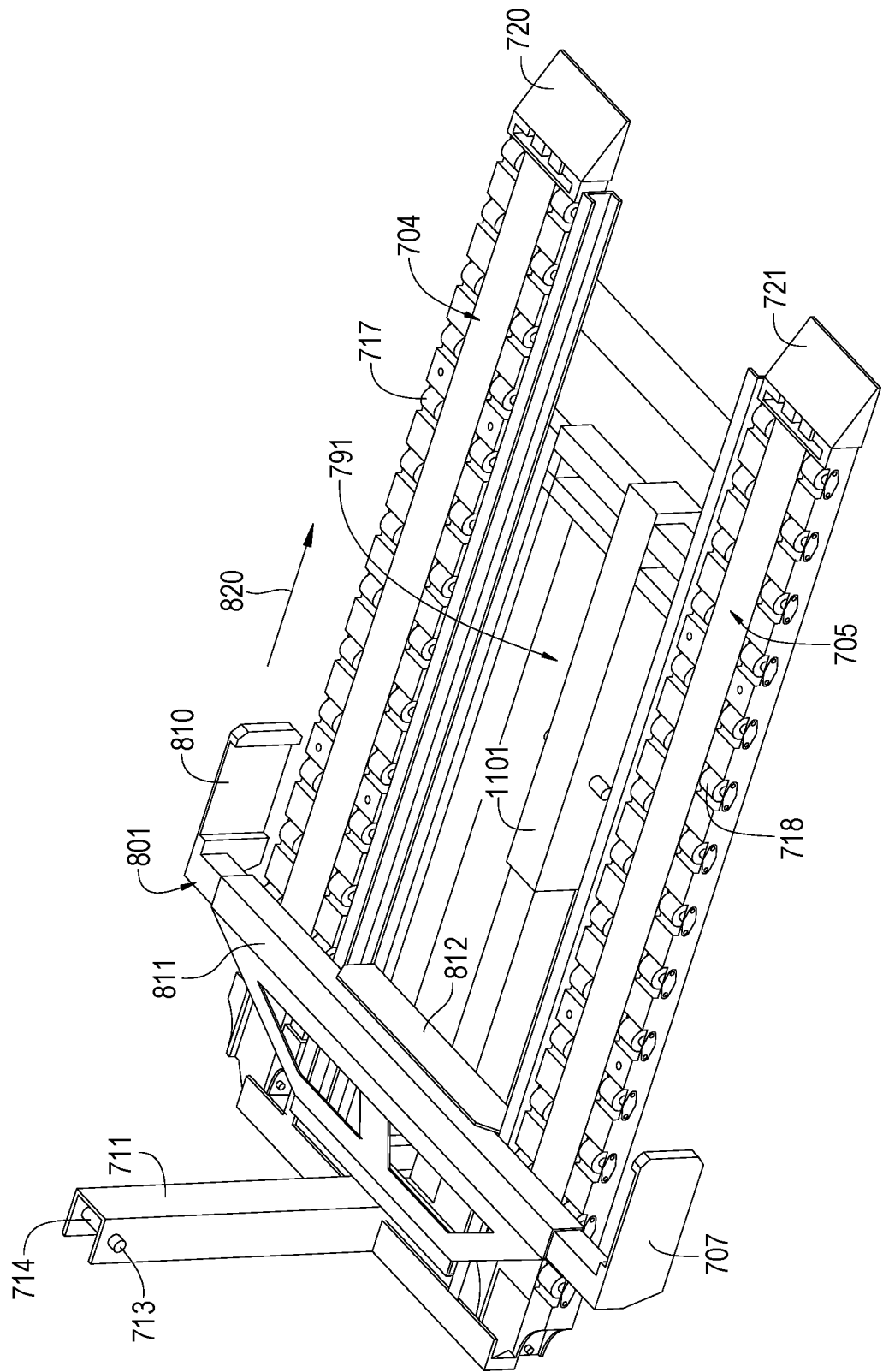
FIG. 8 depicts forks, a moveable bar, and an actuator of the ARCS shown in FIG. 8.

FIG. 8 depicts a portion of the ARCS 790. In this regard, the portion of the ARCS 790 shown depicts the left roller fork 704 and the right roller fork 705. The left roller fork 704 and the right roller fork 705 sis comprised of rollers 717 and 718, respectively. The rollers 717 and 718 aid in collecting the load. That is, the load easily slides up and onto the forks 704 and 705 via the blades 720 and 721 and rollers 717 and 718.

In the bed 791 of the ARCS 790 is stowed the lateral bar 1101. The lateral bar 1101 is fixedly coupled to an end of the central bar 711 at a ninety-degree angle. Note that the underside of the lateral bar 1101 a hydraulic cylinder (not shown) is attached thereto.

The moveable bar 801 is fixedly coupled to the triangular member 710 (FIG. 7). As the hydraulic cylinder (not shown) activates, the lateral arm 1100 moves upward and laterally thereby moving the central bar 711. As the central bar 711 moves upward and laterally, the triangular member 710 rotates about pivot point 713 and pin 714 and moves the forks 704 and 705 until the forks 704 and 705 are parallel with the ground and the blades 720 and 721 are situated beneath the pallet 901 (FIG. 10) on which the load sits.

At the end of the moveable bar 801, the ARCS 790 comprises gripping plates 707 and 810. The gripping plates 707 and 810 comprise inward protrusions (not shown). When the moveable bar 801 moves to the pallet 901 (FIG. 10), the gripping plates 707 and 810 grasp openings (not shown) in the pallet 901, so the bar 801 can pull the load 900, via the pallet 901 up onto the ARCS 790.

Figure 9:
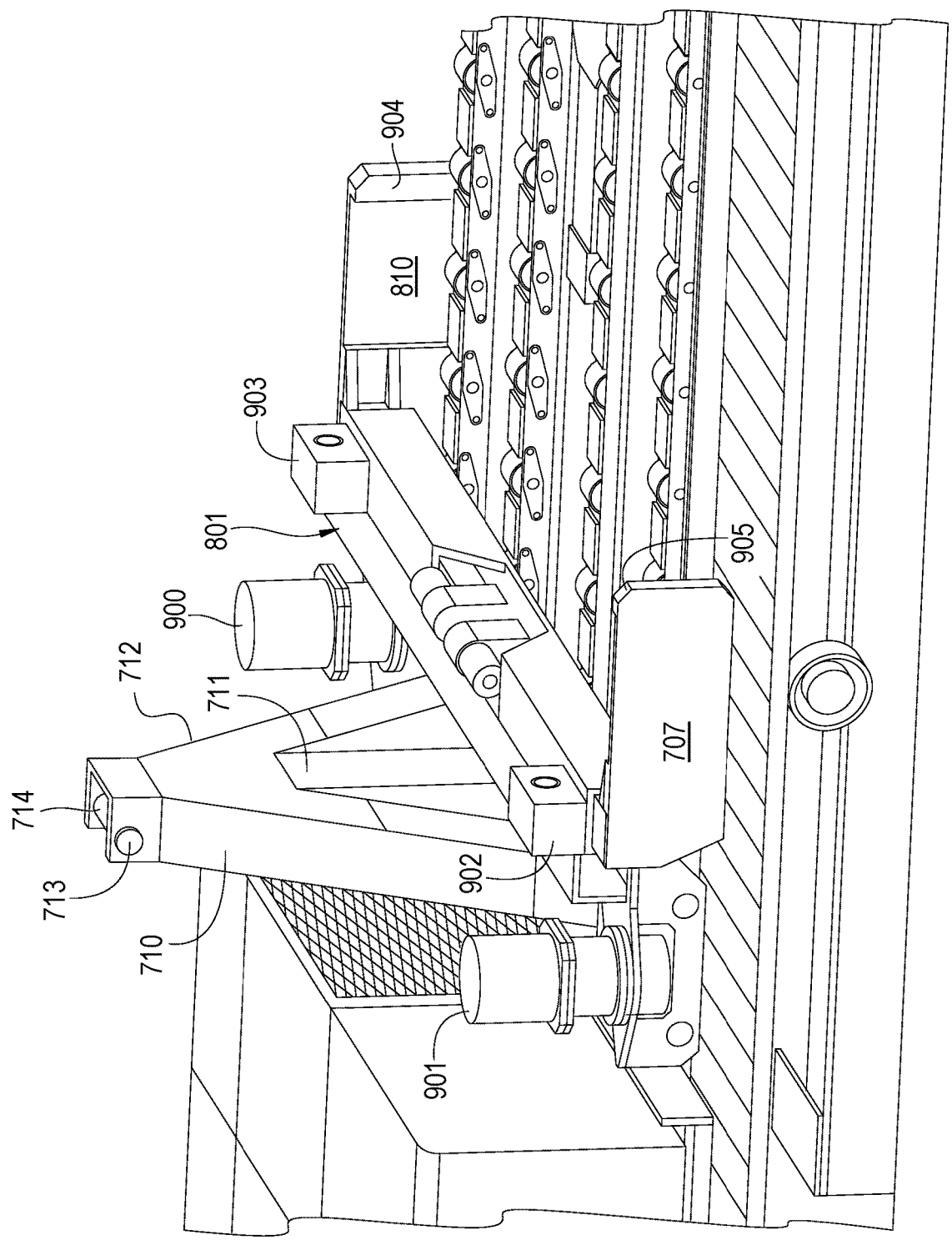
FIG. 9 depicts a section of the ARCS shown in FIG. 8 illustrating the moveable bar grasping a pallet in accordance with an embodiment of the present disclosure.

FIG. 9 is a perspective view of a portion of the ARCS 790. The bar 801 comprises gripping plates 810 and 707 laterally disposed on each end of the bar 801. The gripping plates 810 and 707 have inward protrusions 904 and 905, respectively. The protrusions 904 and 905 lock into openings on the sides of the pallet 901 (FIG. 10) on which the load sits. Thus, as the bar 801 moves backwards, over the forks 704 and 705, the protrusions 904 and 905 pull the pallet, and thus the load, onto the forks 704 and 705.

Once the pallet 901 (FIG. 10), and thus the load, are situated securely on the forks 704 and 705, the hydraulic arm activates. The hydraulic arm pulls the lateral bar 1101, which causes the central bar 711 to move backward. As the central bar 711 moves backward, the triangular member 711 pivots about pivot point 713, pulling the forks 704 and 705 upward and backward. The hydraulic arm continues to pull the central bar 711 backward until the pallet 901, and thus the load, rest on the forks 704 and 705 atop the bed 791 of the ARCS 790.

Note that the ARCS 790 further comprises laser scanners 900 and 902. The laser scanners 901 and 902 are positioned such that the laser scanners 900 and 902 can obtain a full view of the surroundings of the ARCS 790 when a load is atop the ARCS 790. The laser scanners 900 and 902 detect the environment, detect the box and pallet 901 (FIG. 10), aid in navigation by providing obstacle avoidance. This is described herein with reference to ARCS 100.

Furthermore, the ARCS 790 comprises cameras 903 and 902. The cameras 903 and 902 are used by the ARCS robot system 501 to position the ARCS 790 in an aircraft. In this regard, the ARCS 790 comprises the ARCS robot system 501 shown in FIG. 4.

Thus, the ARCS 790 is capable of navigating to a pallet 901 (FIG. 10) having a load 900, and picking up the pallet 901, and thus the load 900. Once the ARCS 790 obtains the load, the ARCS 790 navigates back to the aircraft, as described hereinabove. In this regard, the ARCS 790 can navigate around obstacles and locate the ramp for the aircraft, move up the ramp, and deliver the pallet 901, and thus the load, to the aircraft. This maneuvering may be done in an austere environment and is done without human intervention.

Figure 10:
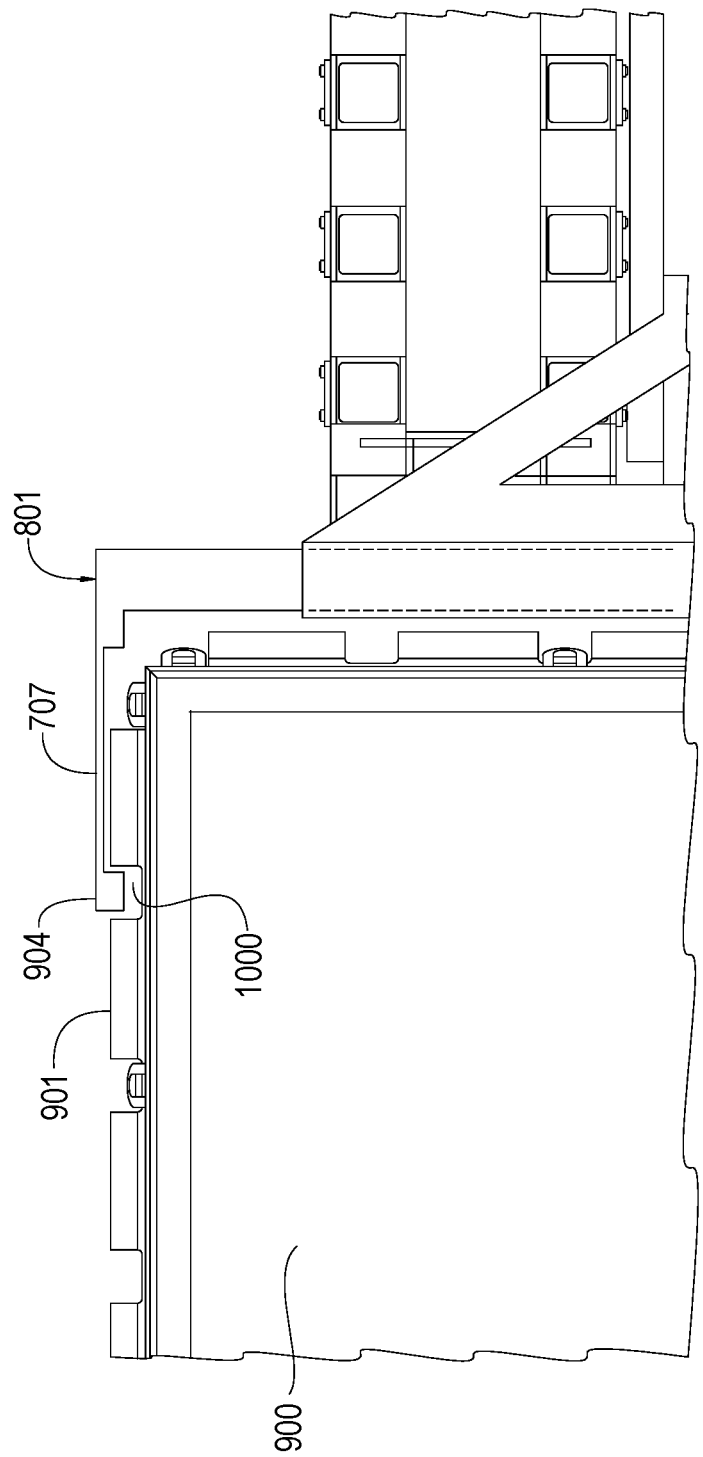
FIG. 10 is a perspective view of the actuator, the moveable bar, and the forks of the ARCS shown in FIG. 8.

FIG. 10 depicts a portion of the ARCS 790 viewed from the top. In this regard, the bar 801 has been moved to the pallet 901, and thus the load 900. The protrusion 904 of the gripping plate 801 fits within an opening 1000 in the pallet 901. While not shown, the protrusion 905 of the gripping plate 707 first within an opening (not shown) on the opposite side of the pallet 901. Thus, as the bar 801 moves backward, the pallet 901, and thus the load 900, are pulled up and onto the forks 704 and 705.

Figure 11:
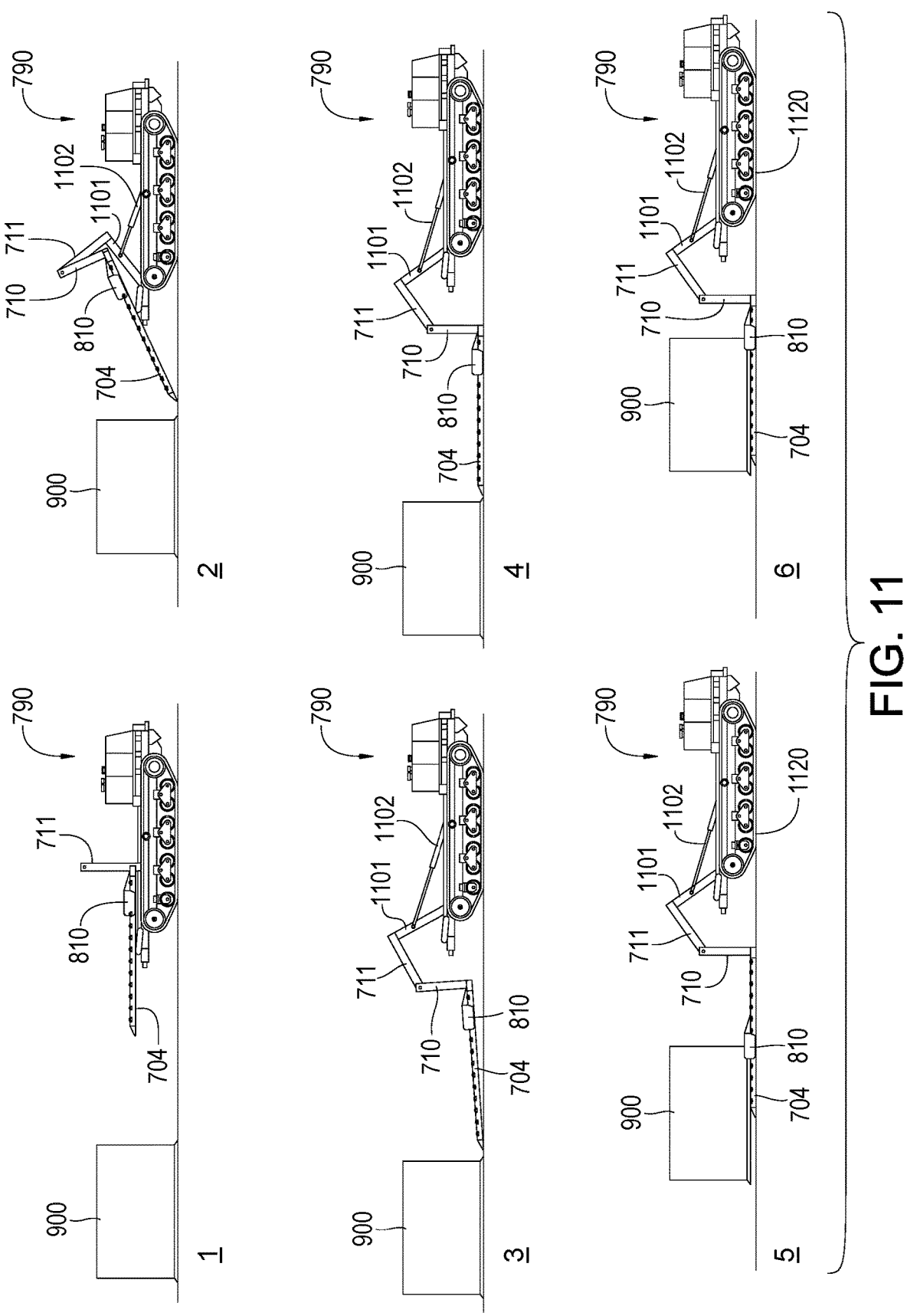
FIG. 11 depicts a sequence of events 1-6 showing the ARCS shown in FIG. 8 preparing to move a load onto the ARCS.

FIG. 11 depicts a progression of events 1-6 showing the ARCS 790 preparing to move a load 900 onto the ARCS 790. In progression part 1, the load 900 is positioned a distance from the ARCS 790. The ARCS 790 begins to move the bar 801, the central bar 711 and thus the forks 704 and 705 (FIG. 7) move forward toward the load 900.

In progression part 2, a hydraulic cylinder 1102, which is coupled to the lateral bar 1101, provides mechanical and linear force to the lateral bar 1101. When mechanical and linear force is applied to lateral bar 1101, the central bar 711 moves upward and laterally because the lateral bar 1101 is fixedly coupled to the central bar 711 at a right angle. As the central bar 711 moves upward and laterally, the triangular member 710 pivots about pivot point 713 (FIG. 7) the central bar 711 applying downward, linear forward force to the forks 704 and 705.

In progression part 3, as the hydraulic cylinder 1102 continues to apply force to the central bar 711, the forks 704 and 705 continue to move forward and downward. That is, the triangular member 710 continues to apply forward and downward force to the forks 704 and 705.

In progression part 4, the hydraulic cylinder 1102 has completed its extension. Thus, the forks 704 and 705 rest on the ground in front of the pallet 901 (FIG. 10), and thus the load 900.

In progression part 5, the ARCS 790 begins to move forward via tracks 1120 and 703 (FIG. 7). As the forks 704 and 705 move forward, the forks 704 and 705 go under the pallet 901 (FIG. 10), and thus the load 900. Also, the bar 801 moves forward to grasp the pallet 901 with the gripping plates 810 and 707 (FIG. 7).

In progression part 6, the bar 801 and gripping plates 810 and 707 (FIG. 7) continue to move rearward. The farther the bar 801 and gripping plates 810 and 707 move rearward, the farther the pallet 901 (FIG. 10), and thus the load 900 is pulled onto the forks 704 and 705.

Figure 12:
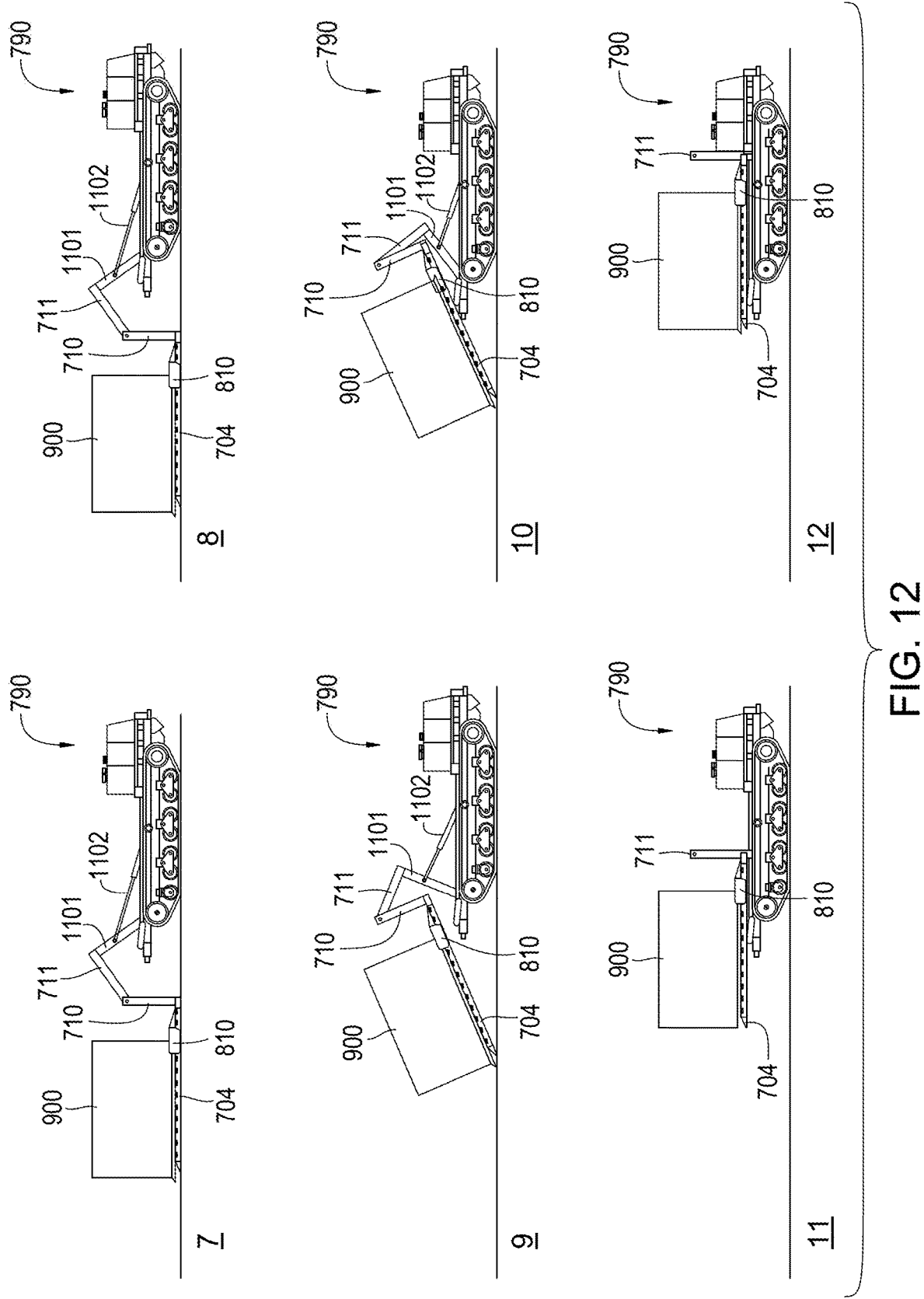
FIG. 12 depicts a sequence of events 7-12 showing the ARCS shown in FIG. 8 moving the load onto the ARCS.

FIG. 12 depicts a progression of events 7-12 showing the ARCS 790 shown in FIG. 8 moving the load 900 onto the ARCS 790.

In progression part 7, the bar 801 and gripping plates 810 and 707 continue to move the pallet 901 (FIG. 10), and thus the load 900, onto the forks. The farther the bar 801 and gripping plates 810 and 707 move forward, the further the pallet 901, and thus the load 900, is drawn onto the forks 704 and 705. Note that the triangular member 710 is positioned vertically at a ninety-degree angle from the ground. Thus, the triangular member 710 is positioned vertically at a ninety-degree angle from the forks 704 and 705. The central bar 711 about which the triangular member 710 pivots is positioned at an acute angle relative to the triangular member 710. Further, the lateral bar 1101 is fixedly coupled at a ninety-degree angle to the central bar 711. Additionally, the hydraulic cylinder 1102 is completely extended to the lateral bar 1101 such that the forks 704 and 705 are situated directly under the pallet 901, and thus the load 900.

In progression part 8, the ARCS 790 has completely maneuvered the forks 704 and 705 underneath the pallet 901 (FIG. 10), and thus the load 900. The protrusion 904 (FIG. 9) of the gripping plate 801 is situated within the opening 1000 (FIG. 10) in the pallet 901. Thus, when the ARCS 790 begins to pull the forks 704 and 705 back onto the ARCS 790, the gripping plates 801 and 707 (FIG. 9) pull the load 900 by pulling the pallet 901.

In progression part 9, the hydraulic cylinder 1102 pulls the lateral bar 110. Because the lateral bar 110 is fixedly coupled at a ninety-degree angle with the central bar 711, the central bar 711 moves backwards toward the ARCS chassis 701 (FIG. 7). As the central bar 711 moves backward, the central bar 711 pulls the triangular member 710, which pivots about the central bar 711 about pivot point 713 (FIG. 7). As the triangular member 710 moves backward as it pivots about central bar 711, the forks 704 and 705 travel upward at an angle and backward toward the ARCS 790 while retaining the load 900.

In progression 10, the hydraulic cylinder 1102 continues to pull the lateral bar 110. Because the lateral bar 110 is fixedly coupled at a ninety-degree angle with the central bar 711, the central bar 711 continues to move backward toward the ARCS chassis 701 (FIG. 7). As the central bar 711 moves backward, the central bar 711 pulls the triangular member 710, which pivots about the central bar 711 about pivot point 713. As the triangular member 710 moves backward as it pivots about central bar 711, the forks 704 and 705 travel upward at an angle, onto the bed 791 (FIG. 8) and backward toward the ARCS chassis 701 while retaining the load 900.

In progression 11, the hydraulic cylinder has pulled the load 900 via the triangular member 710, the central bar 711, and the lateral bar 1101 onto the bed 791 (FIG. 7). Once the load 900 is flat upon the forks 704 and 705, the ARCS 790 activates the bar 801, and the load 900 atop the forks 704 and 705 moves till the central bar 711 is adjacent the chassis 701.

In progression 12, the hydraulic cylinder 1102 has pulled the lateral bar 1101 toward the chassis 701. Because the lateral bar 1101 is fixedly coupled at a ninety-degree angle with the central bar 711, the central bar 711 moves backward toward the ARCS chassis 701. As the central bar 711 moves backward, the central bar 711 pulls the triangular member 710, which pivots about the central bar 711 about pivot point 713. As the triangular member 710 moves backward as it pivots about central bar 711, the forks 704 and 705 travel upward at an angle, onto the bed 791 (FIG. 8) and backward toward the ARCS chassis 701 while retaining the load 900. Upon completion, the load 900 is situated atop the forks 704 and 705. The bar 810 and the central bar 711 rest against the chassis 701.

Figure 13:
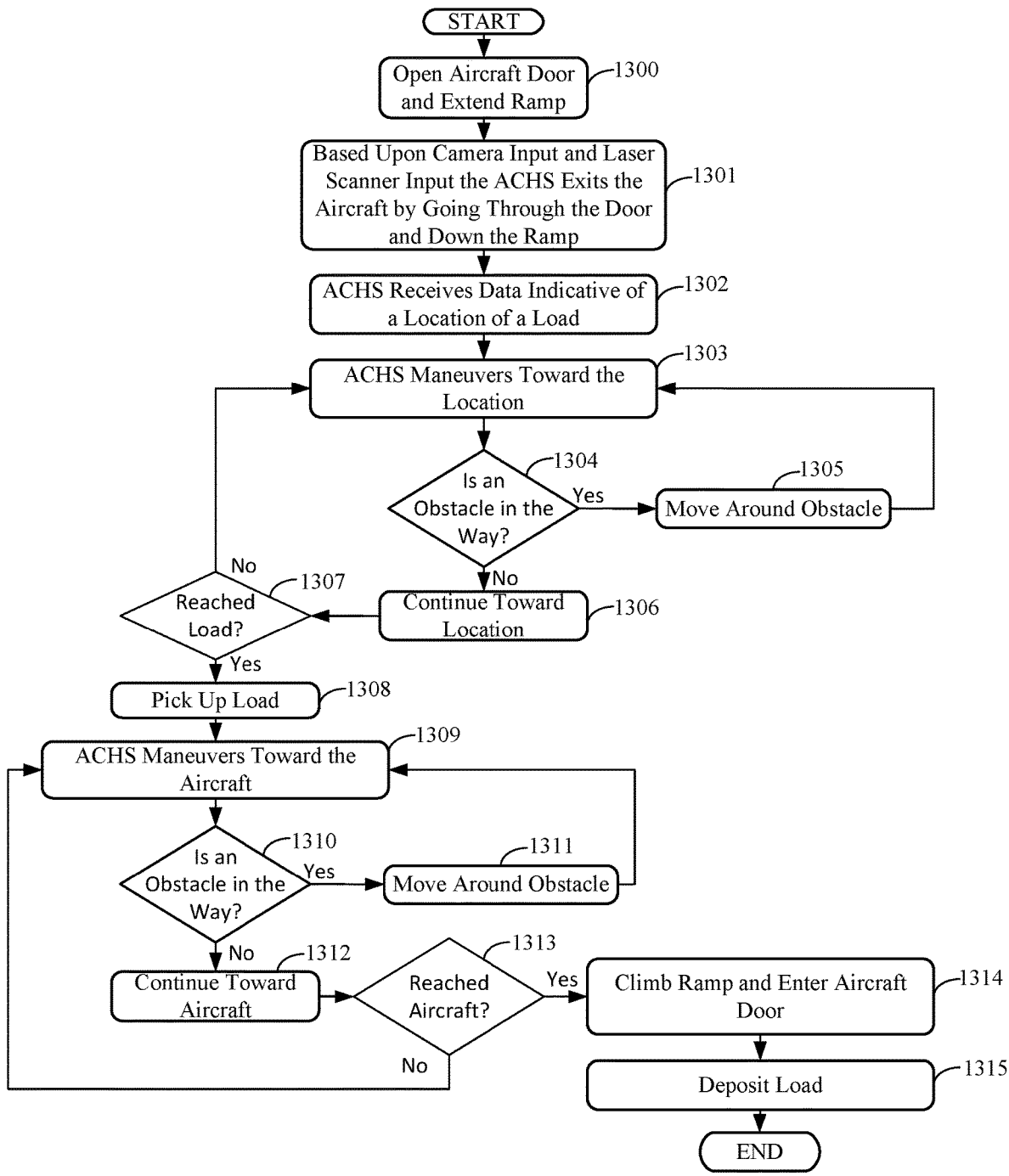
FIG. 13 is exemplary architecture and functionality of the ARCS shown in FIG. 1 and the ARCS shown in FIG. 7.

FIG. 13 is a flowchart depicting exemplary architecture and functionality of the ARCS 100 (FIG. 1) and the ARCS 790 (FIG. 7). Both the ARCS 100 and the ARCS 790 behave in a substantially similar fashion. In this regard, the ARCS 100 and the ARCS 790 remove a load from an aircraft and deposit the load at a predetermined location. In moving the load to the location for deposit, the ARCS 100 and the ARCS 790 use laser scanners and cameras to detect their environments. In this regard, the ARCS 100 and the ARCS 790 continuously examine the environment for obstacles, and if the ARCS 100 or the ARCS 790 encounter an obstacle, the ARCS 100 and the ARCS 790 move around the obstacle and continue to the deposit location. Note that in one embodiment, the ARCS 100 and the ARCS 790 do not necessarily remove a load from the aircraft. In such a situation, the ARCS 100 and the ARCS 790 may be used to exit the aircraft and pick up a load in an austere environment.

In step 1300, the aircraft operator opens the door and extends the ramp. In step 1301, based upon camera input and laser scanner input, the ARCS 100 or ARCS 790 loads cargo or supplies if necessary, and exits the aircraft by going through the door and down the ramp.

In step 1302, the ARCS 100 or ARCS 790 receives location data indicative of the location for a load that the ARCS 100 or ARCS 790 is to pick up. Note that are many ways the ARCS 100 or the ARCS 790 may receive this location data. It may be preprogrammed in the ARCS 100 or the ARCS 790. Further, location data may be transmitted to the ARCS 100 or the ARCS 790 wirelessly. These are only exemplary means by which the ARCS 100 and the ARCS 790 may receive location data. Other ways are possible in other embodiments.

Upon receipt of the location data, the ARCS 100 or the ARCS 790 maneuvers toward the location. As the ARCS 100 or the ARCS 790 is moving toward the location it is continuously analyzing its environment.

Thus, as the ARCS 100 or the ARCS 790 detects an obstacle in the way of the path toward the location in step 1304, the ARCS 100 or the ARCS 790 moves around the obstacle in step 1305. After the ARCS 100 or the ARCS 790 moves around the obstacle, the ARCS 100 or the ARCS 790 continues to maneuver toward the location in step 1303.

If the ARCS 100 or the ARCS 790 do not detect an obstacle in their way, the ARCS 100 or the ARCS 790 continues toward the location in step 1306. If the ARCS 100 or the ARCS 790 do not reach the load in step 1307, the ARCS 100 or the ARCS 790 continues toward the location in step 1303. However, if the load is reached in step 1307, the ARCS 100 or the ARCS 790 picks up the load and stows the load on the ARCS 100 or the ARCS 790. In step 1309, the ARCS 100 or the ARCS 790 maneuvers toward the aircraft based upon input from the cameras and the laser scanners.

If there is an obstacle in the way in step 1310, the ARCS 100 or the ARCS 790 moves around the obstacle in step 1311. Further, the ARCS 100 or the ARCS 790 continues to maneuver toward the aircraft. If there is no obstacle in the way, the ARCS 100 or the ARCS 790 continues toward the aircraft in step 1312.

If the ARCS 100 or the ARCS 790 does not reach the aircraft in step 1313, the ARCS 100 or the ARCS 790 maneuvers toward the aircraft in step 1309. If, however, the ARCS 100 or the ARCS 790 reaches the aircraft in 1313, the ARCS 100 or the ARCS 790 climbs the aircraft ramp and enters the aircraft door in step 1314 and deposits the load in step 1315.

What I claimed is:

1. An autonomous robotic cargo system (ARCS) for moving cargo in an austere environment, comprising:
   a chassis coupled to one or more tracks configured and arranged for moving the chassis from inside an aircraft to a designated location, the chassis further coupled to one or more forks and a moveable bar that moves outwardly from the chassis and extends laterally across the ARCS, the moveable bar comprising a first gripping plate and a second gripping plate, wherein the one or more forks and the moveable bar are configured and arranged for loading cargo in the aircraft, the chassis further coupled to a laser scanner positioned on the chassis to capture data indicative of the chassis' said environment and a laser target designator interface for detecting waypoints; and
   a control processor configured to travel from the aircraft to the designated location based upon laser scanner data received from the laser scanner, the control processor further configured to control the one or more forks to pick up said cargo and control the one or more tracks to automatically move the cargo from the aircraft to the designated location and based only upon the designated location, unload the cargo at the designated location, and automatically navigate the chassis back to and inside the aircraft.

2. The ARCS for of claim 1, further comprising simultaneous location and mapping (SLAM) logic and an inertial navigation unit (INU) configured for determining current locations of the chassis as the chassis moves from a first location to a second location.

3. The ARCS of claim 2, wherein the SLAM logic is further configured to detect objects in real-time as the chassis moves from the first location to the second location.

4. The ARCS of claim 3, wherein the control processor is further configured to control movement of the one or more tracks to avoid the objects based upon data received from the SLAM logic.

5. The ARCS of claim 1, further comprising simultaneous location and mapping (SLAM) logic.

6. The ARCS of claim 5, wherein the SLAM logic bi-directionally communicates with the laser scanner, a camera, and an inertial navigation unit (INU).

7. The ARCS of claim 6, wherein the camera is an electro optic/infra-red camera.

8. The ARCS of claim 7, wherein the laser scanner collects laser data indicative of distances from objects, azimuth, elevation, and surface shape of the objects.

9. The ARCS of claim 8, wherein the inertial navigation unit collects INU data indicative of a position, a direction, a speed, and an orientation of the chassis in real-time as the chassis moves from a first location to a second location.

10. The ARCS of claim 9, wherein the SLAM logic is configured to generate SLAM data indicative of the surrounding environment of the chassis based upon the INU data, the video data, and the laser data.

11. The ARCS of claim 10, wherein the control processor is configured to alter a pathway of the chassis based upon the SLAM data.

12. The ARCS of claim 1, further comprising a manual entry device.

13. The ARCS of claim 12, wherein an operator enters data indicative of waypoints defining a pathway into a graphical user interface (GUI) of the manual entry device.

14. The ARCS of claim 13, wherein the manual entry device is a cellular phone or a tablet.

15. The ARCS of claim 1, further comprising navigation algorithms, the navigation algorithms configured for determining a pathway and motion of the chassis for moving the chassis from a first location to a second location.

16. The ARCS of claim 1, wherein the chassis autonomously loads itself onto designated aircraft when the aircraft lands in the chassis' environment.

17. The ARCS of claim 16, wherein an aircraft operator opens an aircraft door and extends an aircraft ramp, and the chassis is configured to move out the aircraft door and down the aircraft ramp.

18. The ARCS of claim 17, wherein the control processor is configured to move the chassis a predetermined distance based on a compass heading while navigating around objects.

19. The ARCS of claim 18, wherein the control processor is further configured to move the chassis back to the aircraft and board the aircraft via the aircraft ramp and the aircraft door.

20. The ARCS of claim 19, wherein the control logic is configured to move the chassis to a designated waypoint and a pathway is self-generated.

21. The ARCS of claim 20, wherein the control processor is further configured to activate the one or more forks to deposit the cargo and move the chassis back to the aircraft.

22. The ARCS of claim 17, wherein a pathway is chosen by an operator using designated waypoints.

23. The ARCS of claim 17, further comprising a manual hand controller communicatively coupled to the chassis.

24. The ARCS of claim 23, wherein the manual hand controller is configured to move the chassis and the forks based upon actuation by an operator of the hand controller.

25. The ARCS of claim 24, wherein the control processor is further configured to move with the operator and record the pathway.

26. The ARCS of claim 1, wherein the one or more forks comprises end blades that smoothly eases underneath cargo.

27. A method for automatically moving cargo in an austere environment with an autonomous robotic cargo system (ARCS), the ARCS comprising a chassis having a control processor, at least one track responsive to the control processor, at least one fork for carrying cargo responsive to the control processor, a laser range-finder interface responsive to the control processor, and at least one of a camera and a laser scanner responsive to the control processor, the method comprising the steps of:
    loading the cargo from inside of an aircraft on the at least one fork;
    receiving data indicative of at least one designated location;
    automatically moving the ARCS from the aircraft to the designated location based only on the designated location;
    scanning the austere environment to detect for obstacles with the at least one of a camera and a laser scanner and autonomously moving the ARCS to avoid detected obstacles;
    unloading the cargo at the designated location;
    automatically moving the chassis back to and inside the aircraft; and
    wherein the ARCS further comprises a moveable bar that moves outwardly from the chassis and extends laterally across the ARCS, the moveable bar comprising a first gripping plate and a second gripping plate, wherein the at least one fork and the moveable bar are configured for loading the cargo.

28. The method of claim 27, further comprising the step of determining a current location of the ARCS as the ARCS travels using simultaneous location and mapping (SLAM) logic.

29. The method of claim 27, wherein the step of autonomously moving the ARCS to avoid detected obstacles comprises analyzing data from a 3D map generated by the SLAM logic.

30. The method of claim 27, wherein the camera is one of an electro-optic camera and an infra-red camera.

31. The method of claim 27, wherein the at least one fork comprises end blades that smoothly eases underneath cargo.

* * * * *